(12) United States Patent
Anderson, Jr.

(10) Patent No.: US 8,152,464 B2
(45) Date of Patent: Apr. 10, 2012

(54) TAPERED HELICAL AUGER TURBINE TO CONVERT HYDROKINETIC ENERGY INTO ELECTRICAL ENERGY

(76) Inventor: Winfield Scott Anderson, Jr., Palm Beach Gardens, FL (US)

( * ) Notice: Subject to any disclaimer, the term of this patent is extended or adjusted under 35 U.S.C. 154(b) by 0 days.

(21) Appl. No.: 12/902,292

(22) Filed: Oct. 12, 2010

(65) Prior Publication Data

US 2011/0085907 A1    Apr. 14, 2011

Related U.S. Application Data

(63) Continuation-in-part of application No. 12/774,309, filed on May 5, 2010, now Pat. No. 7,938,622, which is a continuation of application No. 12/400,617, filed on Mar. 9, 2009, now Pat. No. 7,728,454.

(60) Provisional application No. 61/116,540, filed on Nov. 20, 2008.

(51) Int. Cl.
  *F03B 3/12*    (2006.01)
  *F03B 13/26*   (2006.01)
(52) U.S. Cl. ................ 416/6; 416/176; 415/4.3; 415/72
(58) Field of Classification Search .............. 416/212 R, 416/212 A, 176, 177; 415/71, 72, 73, 74, 415/75
See application file for complete search history.

(56) References Cited

U.S. PATENT DOCUMENTS

| 102,276 | A | * | 4/1870 | Kinzler | 416/176 |
| 505,402 | A | | 9/1893 | Hill et al. | |
| 1,031,629 | A | * | 7/1912 | de los Rios | 416/176 |
| 1,035,003 | A | * | 8/1912 | Gunther | 416/176 |
| 1,041,912 | A | | 10/1912 | Tyson | |
| 1,090,956 | A | * | 3/1914 | Zinteck | 416/176 |
| 1,371,610 | A | | 3/1921 | Dungan | |
| 2,154,397 | A | | 4/1939 | Cook | |
| 3,187,816 | A | * | 6/1965 | Winter | 416/177 |
| 3,318,388 | A | | 5/1967 | Bihlmire | |
| 3,818,703 | A | | 6/1974 | Lapeyre | |
| 3,818,704 | A | | 6/1974 | Lapeyre | |
| 3,918,838 | A | | 11/1975 | Moody et al. | |
| 4,151,424 | A | | 4/1979 | Bailey | |
| 4,384,212 | A | | 5/1983 | Lapeyre | |

(Continued)

FOREIGN PATENT DOCUMENTS

JP    2007154862 A * 6/2007

(Continued)

*Primary Examiner* — Richard Edgar
(74) *Attorney, Agent, or Firm* — Akerman Senterfitt; Mark D. Passler

(57) ABSTRACT

A helical auger turbine and hydrokinetic device for use with electrical generators for producing electricity. A helical turbine blade may be mounted on a central shaft, and a flange extending perpendicularly to an edge of the turbine blade. The helical auger may be a multi-section auger having radial sections covering a radial arc of between 45 degrees and 180 degrees, and that are rotational molded with identical center sections. The auger may have tapered end sections. The radial and end sections may be interlockingly mounted onto the central shaft to enable the complete transfer of torque captured by the helical auger by a moving fluid media, such as a tidal water flow, to the central shaft. The adjacent surfaces of the radial and end sections may be flush with one another to reduce disruptions of the moving fluid flowing over the completed helical auger and rotating the assembled helical auger.

18 Claims, 17 Drawing Sheets

U.S. PATENT DOCUMENTS

| | | | |
|---|---|---|---|
| 4,412,417 A | 11/1983 | Dementhon | |
| 4,443,708 A | 4/1984 | Lapeyre | |
| 4,465,941 A | 8/1984 | Wilson et al. | |
| 4,500,259 A | 2/1985 | Schumacher | |
| 4,524,285 A | 6/1985 | Rauch | |
| 4,708,592 A | 11/1987 | Krolick et al. | |
| 4,717,832 A | 1/1988 | Harris | |
| 4,849,647 A | 7/1989 | McKenzie | |
| 5,368,438 A | 11/1994 | Raible | |
| 5,451,137 A | 9/1995 | Gorlov | |
| 5,501,574 A | 3/1996 | Raible | |
| 5,642,984 A | 7/1997 | Gorlov | |
| 6,036,443 A | 3/2000 | Gorlov | |
| 6,135,729 A | 10/2000 | Aber | |
| 6,139,255 A | 10/2000 | Vauthier | |
| 6,357,997 B1 | 3/2002 | Rosefsky | |
| 6,626,638 B2 | 9/2003 | Rosefsky | |
| 7,044,711 B2 | 5/2006 | Duncan, Jr. | |
| 7,063,579 B2 | 6/2006 | Voves | |
| 7,084,521 B1 | 8/2006 | Martin | |
| 7,633,174 B1 | 12/2009 | Feiler | |
| 2011/0081243 A1* | 4/2011 | Sullivan | 416/176 |

FOREIGN PATENT DOCUMENTS

| | | |
|---|---|---|
| WO | 2006/059094 A1 | 6/2006 |
| WO | 2006/108421 A1 | 10/2006 |

* cited by examiner

TAPERED HELICAL AUGER TURBINE TO CONVERT HYDROKINETIC ENERGY INTO ELECTRICAL ENERGY

CROSS-REFERENCE TO RELATED APPLICATION

This patent application is a continuation-in-part of U.S. patent application Ser. No. 12/774,309, filed May 5, 2010, which is a continuation of U.S. patent application Ser. No. 12/400,617, filed Mar. 9, 2009, which claims the benefit of U.S. Provisional Patent Application No. 61/116,540, filed Nov. 20, 2008, the entirety of all three are incorporated by reference herein. Further, this patent application is related to U.S. patent application Ser. No. 12/640,855, filed Dec. 17, 2009, which is a divisional of U.S. patent application Ser. No. 12/400,617.

FIELD OF THE INVENTION

The present application relates to a hydrokinetic energy converter, and particularly to a tapered helical auger turbine that can be coupled by hydraulic circuits to a generator to produce electricity from flowing water.

BACKGROUND

Many proposals have been made for generating electricity from tidal and other water flows, using hydrokinetic energy generation. A Policy Statement issued on Nov. 30, 2007 by the Federal Energy Regulatory Commission stated that "[e]stimates suggest that new hydrokinetic technologies, if fully developed, could double the amount of hydropower production in the United States, bringing it from just under 10 percent to close to 20 percent of the national electric energy supply. Given the potential benefits of this new, clean power source, the Commission has taken steps to lower the regulatory barriers to its development." (FERC Policy Statement No. PL08-1-000). Initial proposals for hydrokinetic generation used turbine blades that were able to rotate under pressure from the flow of water. However, such systems were often only able to operate when the water was flowing in one direction. Even if energy could be generated from a tidal flow in both directions of flow, other significant issues arise because peak power flow is only available from a tidal flow at roughly 12-hour intervals. This can cause issues with maximum grid capacities needed to transmit the generated power. Storage devices to smooth out dispatch of power are desirable, but land requirements for the huge batteries, dual reservoir requirements for hydro storage and low efficiency of fuel cells have made known storage devices too expensive to be effective. Thus, known hydrokinetic devices have not been economically viable.

Generally, four types of hydrokinetic devices have been tested in recent years. These are: horizontal axis turbines, vertical axis turbines, oscillating hydrofoils and a Venturi system where water is accelerated through a "choke system" to create a pressure drop that can be used to drive turbines. One example of a vertical helical turbine generator is known from U.S. Pat. No. 6,036,443 to Gorlov. Gorlov discloses a vertically oriented helical turbine which includes helical airfoil-shaped blades that are arranged in a spiral about a central shaft. The helical arrangement allows the turbine generator to be used in multidirectional fluid flows. An array of the turbines can be provided to increase power output. U.S. Pat. No. 4,384,212 to Lapeyre discloses a horizontally mounted helical turbine that is used on the surface to translate surface wave energy into electrical energy. Another surface mounted helical generator is disclosed in U.S. Pat. No. 2,154,397 to Cook.

Significant issues are also caused by known devices to marine life, which can be harmed by the rotating turbine blades. Various proposals to reduce the damage to marine life includes encasing the turbine blades in a wire mesh cage, which adds to the expense of the installation and only act to protect larger animals such as turtles from coming into contact with the blades. However, the cages do nothing to prevent smaller fish from being harmed. Additionally, many proposed turbine blades can suffer damage from water-borne debris, and even shipping. Due to these problems, acceptance of hydrokinetic devices by local communities and environmentally aware groups has not been as strong as hoped for, and the reliability of the devices has been limited Most previous hydrokinetic generation proposals additionally involve providing a rigid housing or anchoring system to retain the generator. This can be prohibitively expensive, as it can involve anchoring installations, and also the installation of energy supply cabling and pipes. Additionally, once installed, there is typically not much flexibility to allow the turbines to move with different water flows. Various proposals exist to ameliorate these difficulties, including U.S. Pat. No, 4,849,647 to McKenzie discloses a floating helical turbine which is connected to a tether line by a flexible ball joint. U.S. Pat. No. 4,708,592 to Krolick et al. discloses a non-rigid helicoidal wind turbine that uses a flexible fabric sheet to form the helix, and which can be tethered to existing mast structures using swivel joints.

For the foregoing reasons, none of the suggested hydrokinetic energy devices have been successful in practice. Thus, there remains a need for an hydrokinetic energy generator that is efficient, can work in a variety of water flow situations possibly including an ice/water mix, and which does not harm marine life.

SUMMARY

In accordance with one aspect of the exemplary embodiments, a helical auger turbine is disclosed for use as a hydrokinetic device to capture, store, and steadily release energy to drive remote electrical generators. The auger turbine includes a generally helical turbine blade rotatably mounted on a central shaft, and a flange extending perpendicularly to an edge of the turbine blade. The outside spiral flange captures a larger percentage of the moving fluid energy than a simple blade. At least one turbine blade support connection is included for connecting the central shaft to a support structure. An electrical generator may be powered by the helical auger turbine, either remotely through an intermediary device or directly. The helical auger turbine can operate a high pressure pump connected to a hydraulic accumulator for storing pressurized hydraulic fluid. An electrical generator can be operated from fluid stored in the hydraulic accumulator at times of slow water flow. A plurality of helical auger turbines can be horizontally oriented under water, tethered to legs of an ocean platform such as an oil rig secured to the seabed.

The hydrokinetic renewable energy system/method according to the invention generates electricity with no carbon footprint. It can generate totally clean electricity 24 hours a day, 7 days a week, with no peaks and troughs in the energy supply due to the variations in tidal flow.

The turbine blade support connection can comprise a nose cone which is adapted to maintain the orientation of the helical auger turbine parallel to a fluid flow direction. The turbine can be formed of at least one of rotationally molded plastics and carbon fiber, and may have internal metal reinforcement structures sufficient to withstand the horizontal forces of fast moving water. The flange can extend to both sides of the turbine blade, and may have rounded edges. A width of the spiral flange can be equal to approximately 25% of the diameter of the helical turbine blade, ±approximately 10%.

In some arrangements, a width of the turbine blade is reduced at each end to provide tapered terminal sections. In some arrangements, the tapered terminal sections may be free of the spiral flange, which may itself be tapered at the start or prior to the tapered terminal sections of the turbine blade.

In accordance with another aspect of the exemplary arrangements, a hydrokinetic device includes at least one helical auger turbine having a generally helical turbine blade rotatably mounted on a central shaft, a flange extending perpendicularly to an edge of the turbine blade, and at least one turbine blade support connection for connecting the central shaft to a support structure. A high pressure pump is operated by the at least one helical turbine, the high pressure pump operating on fluid in a hydraulic circuit. A hydraulic accumulator is provided for storing pressurized hydraulic fluid from the high pressure pump, and an electrical generator is operable from the hydraulic circuit.

In certain arrangements, valves can be provided in the hydraulic circuit so that the electrical generator can be operated by stored high pressure fluid from the hydraulic accumulator at times of slow water flow.

In some arrangements, valves can be provided in the hydraulic circuit so that flow of fluid in at least a part of the hydraulic circuit can be reversed when the helical auger turbine is rotated in opposite directions by the reversing water flow.

In some arrangements, the hydraulic circuit can operate a hydraulic piston motor, the hydraulic piston motor being connected to the electrical generator.

In one aspect, a helical multi-piece auger rotatable by a moving fluid for the generation of energy may be provided. The helical multi-piece auger may include an interior section having a first helical portion and a first central portion. The first helical portion may be configured to have (1) between approximately 15 degrees and approximately 60 degrees of angled movement with respect to a longitudinal axis of a central shaft, and (2) a first radial arc extending between approximately 45 degrees and approximately 180 degrees circumferentially around the central shaft. The first central portion may have a first cylindrical opening of a first inner diameter. The helical multi-piece auger may include an exterior section having a second helical portion and a second central portion. The second helical portion may have a second radial arc extending between approximately 30 degrees and approximately 90 degrees circumferentially around the central shaft. The exterior section may have a second central portion having a second cylindrical opening of a second inner diameter. The central shaft may be configured to have a cylindrical exterior having an outer diameter. The outer diameter of the central shaft may be approximately equal to or less than both the first inner diameter of the first central portion and the second inner diameter of the second central portion such that the interior and exterior sections are sized to be mounted onto the central shaft. The interior and exterior sections may be configured to non-overlappingly interconnect with each other such that the first helical portion of the interior section and the second helical portion of the exterior section are non-overlapping, and the interconnected interior and exterior sections form at least a portion of the helical multi-piece auger that is rotatable by a moving fluid to facilitate generation of energy from the rotation of the helical multi-piece auger.

In another aspect, a helical multi-piece auger rotatable by a moving fluid for the generation of energy may be provided. The helical multi-piece auger may include an interior section having a first helical portion and a first central portion. The first helical portion may be configured to have a first radial arc extending between approximately 45 degrees and approximately 120 degrees circumferentially around the central shaft. The first central portion may have a first cylindrical opening of a first inner diameter. The helical multi-piece auger may have an exterior section having a second helical portion and a second central portion. The second helical portion may have a second radial arc extending between approximately 30 degrees and approximately 90 degrees circumferentially around the central shaft. The exterior section may have a second central portion having a second cylindrical opening of a second inner diameter. The central shaft may be configured to have a cylindrical exterior having an outer diameter. The outer diameter of the central shaft may be approximately equal to or less than both the first inner diameter of the first central portion and the second inner diameter of the second central portion such that the interior and exterior sections are sized to be mounted onto the central shaft. The interior and exterior sections may be configured to non-overlappingly interconnect with each other such that the first helical portion of the interior section and the second helical portion of the exterior section are non-overlapping and substantially flush with one another, and the interconnected interior and exterior sections form at least a portion of the helical multi-piece auger that is rotatable by a moving fluid to facilitate generation of energy from the rotation of the helical multi-piece auger.

In another aspect, a method of assembling a helical multi-piece auger may be provided. The method may include mounting two or more interior sections each having a first helical portion and a first central portion onto a central shaft having a cylindrical exterior having an outer diameter. The first helical portion of each of the two or more interior sections may be configured to have a first radial arc extending between approximately 45 degrees and approximately 180 degrees circumferentially around the central shaft. The first central portion of each of the two or more interior sections may be configured to have a first cylindrical opening of a first inner diameter. The first inner diameter of the two or more interior sections may be approximately equal to or greater than the outer diameter of the central shaft such that the two or more interior sections are sized to be mounted onto the central shaft. The method may include interconnecting the central shaft and/or the helical multi-piece auger after assembly with a generator configured to generate energy from the rotation of the helical multi-piece auger caused by a moving fluid acting on the two or more interior sections mounted on the central shaft. The two or more interior sections may be configured to non-overlappingly interconnect with each other such that adjoining surfaces of adjacent ones of the two or more interior sections are flush or substantially flush with one another to reduce turbulent flow of the moving fluid moving over the first helical portion of the two or more interior sections, and the interconnected two or more interior sections form at least a portion of the helical multi-piece auger that is rotatable by the moving fluid to facilitate generation of energy via the interconnected generator.

The above-described and other features and advantages of the present disclosure will be appreciated and understood by those skilled in the art from the following detailed description, drawings, and appended claims.

DETAILED DESCRIPTION OF THE INVENTION

Figure 1A:
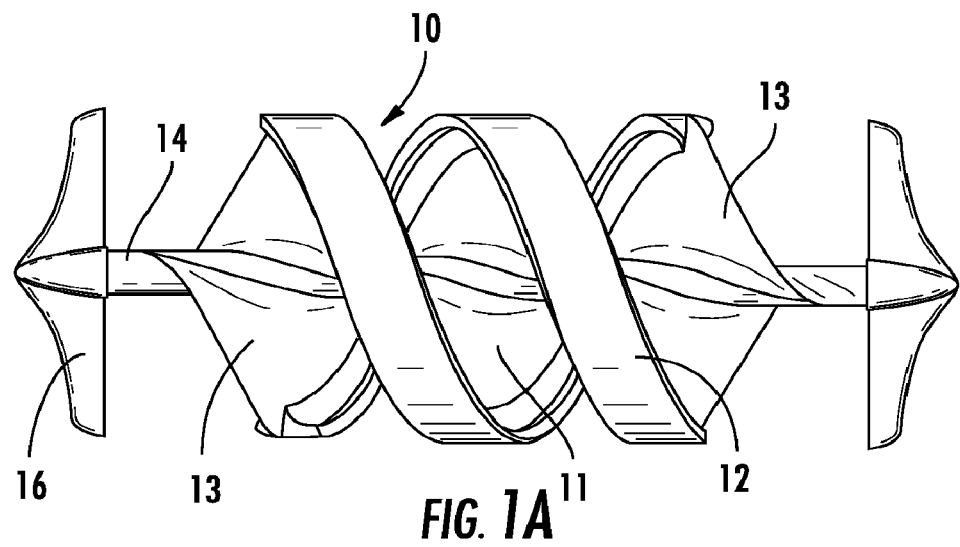
FIGS. 1a, 1b and 1c are top, side and end perspective views of a tapered helical auger turbine according to arrangements of the invention.
Figure 1B:
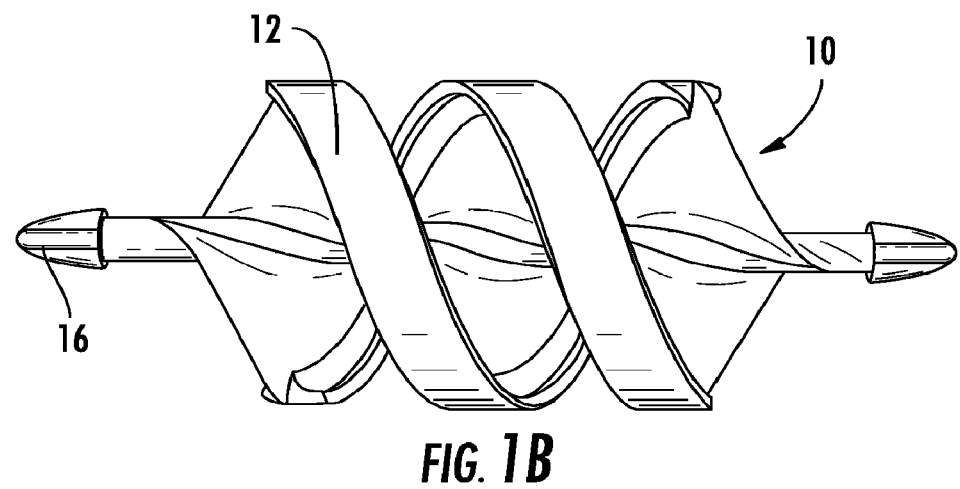
Figure 1C:
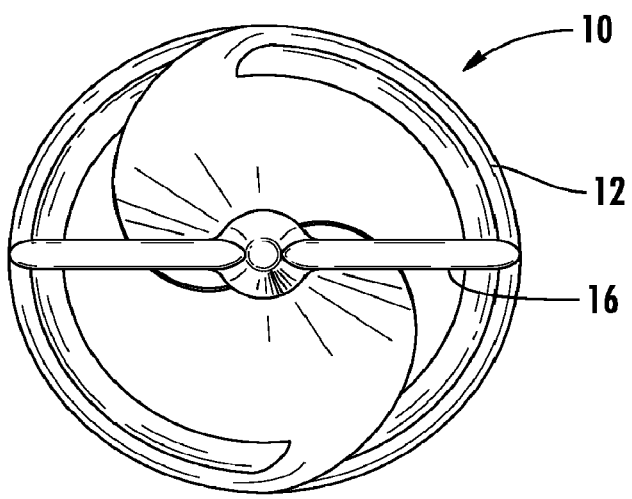
Figure 2:
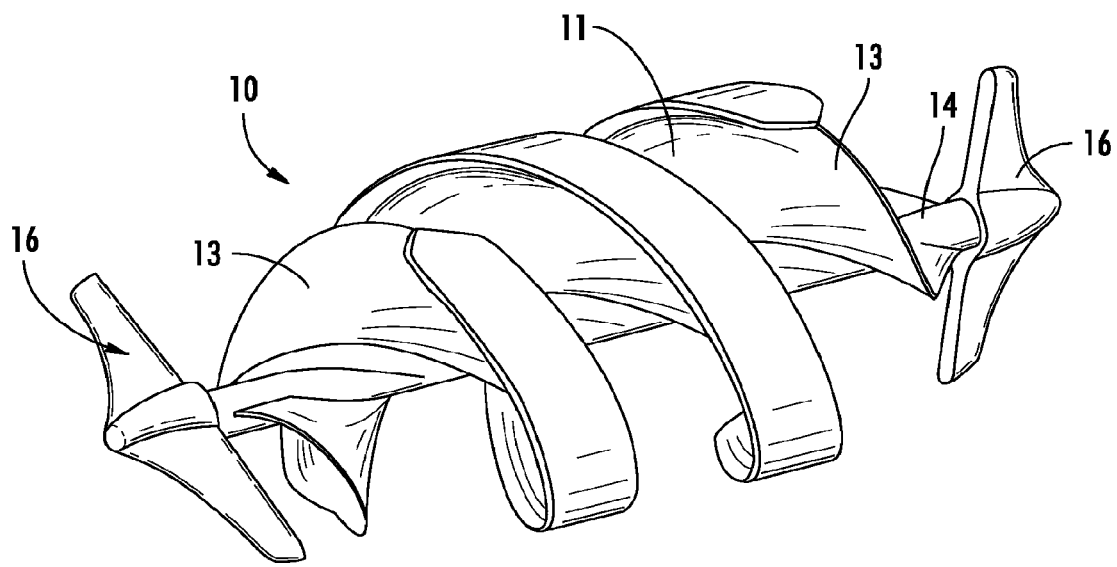
FIG. 2 is a perspective view of a tapered helical auger connected according to arrangements of the invention.
Figure 3A:
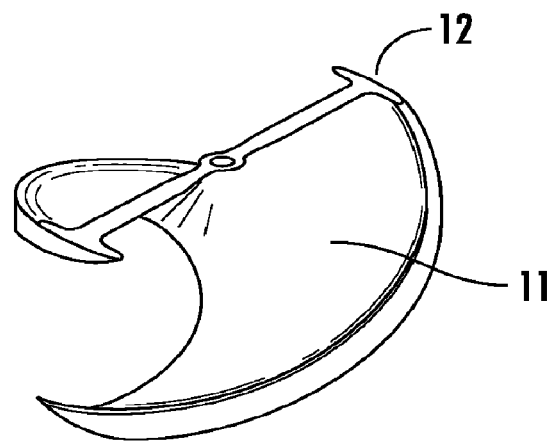
FIGS. 3a and 3b are perspective and end views of center sections of a helical auger according to arrangements of the invention.
Figure 3B:
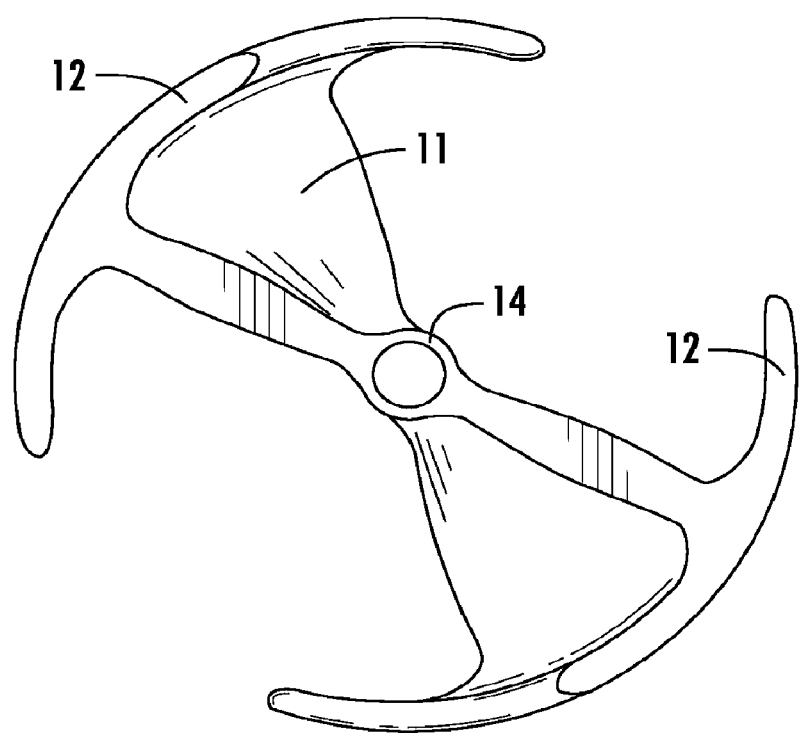
Figure 4:
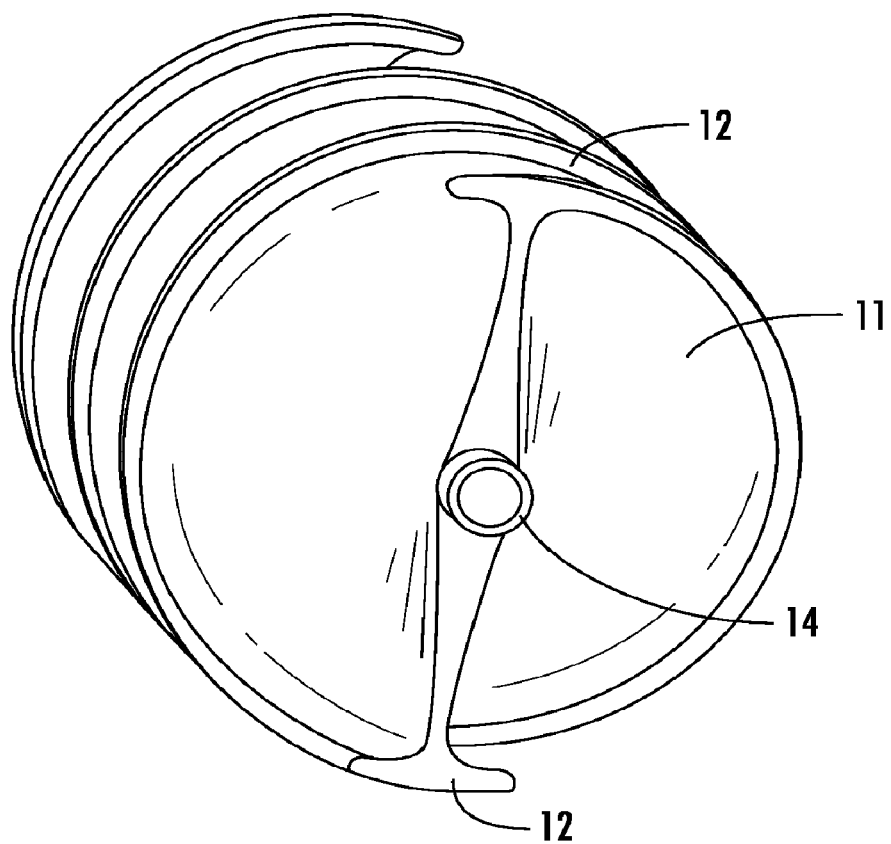
FIG. 4 is an end view of a center section of a helical auger according to arrangements of the invention.
Figure 5:
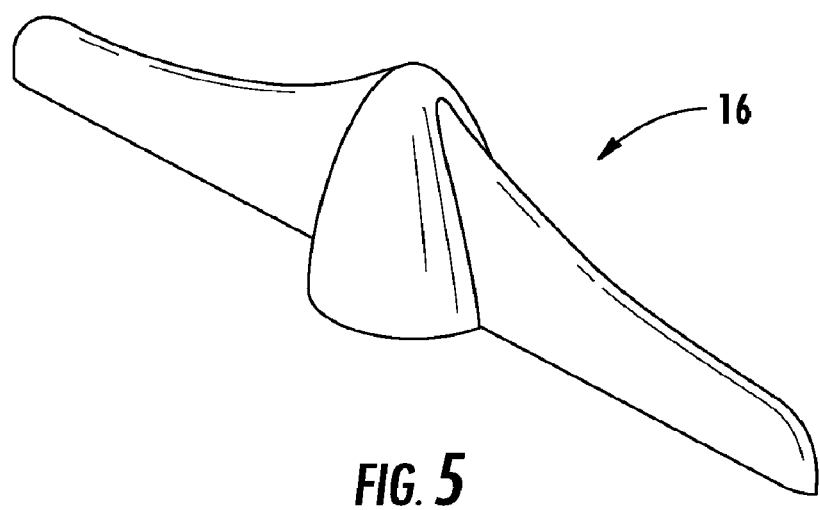
FIG. 5 is a perspective view of a nose cone for connection to a helical auger according to arrangements of the invention.

The exemplary embodiments of the present disclosure are described with respect to a helical auger turbine that can be used in a hydrokinetic energy converter, specifically one that can be used in a tidal flow or river flow. It should be understood by one of ordinary skill in the art that the exemplary embodiments of the present disclosure can be applied to other types of hydrokinetic devices and generators, and even to wind generators.

Referring to the drawings, an exemplary auger turbine 10 is shown. The auger 10 is preferably formed of a lightweight material, such as rotationally molded plastics or molded carbon fiber. It will be appreciated that any suitable material may be used. Reinforcing structures, such as metal ribbing, may be included internally in the turbine blade. In order to aid buoyancy, the auger may be hollow, or can include air pockets or other buoyancy aids. In a preferred arrangement, the helical auger turbine 10 comprises a helical turbine blade 11 provided with a flange 12 at the edge of the blade. The flange 12 is arranged generally perpendicularly to the helical turbine blade 11. In a preferred arrangement, the edges of the flange 12 are smoothly curved, and the turbine blade may also have a gently curved center. In a preferred arrangement, the flange is approximately equal to 25%±10% of the outside diameter of the flange. For example, in an auger 10 that has a 16' diameter, the flange 12 can be 2'-6' in width, preferably 3'-5'.

At each end of the turbine blade 11, a tapered terminal section 13 is provided. In the tapered section 13, the diameter of the turbine blade 11 is gradually and smoothly reduced so that it is tapered into a central-shaft 14. No flange is provided at the edge of the tapered terminal section 13, and in a preferred arrangement, ends of the flange 12 leading into the tapered sections 13 are reduced in diameter, to prevent the formation of a sharp edge to the flange that could damage marine life. The tapered sections 13 help to reduce damage to marine life that may come into contact with the auger 10 from either direction, by providing a tapered lead in. A tapered shape is also more tolerant of water-borne or floating debris, and is less likely to suffer damage therefrom. In one exemplary arrangement, the diameter of the turbine blade 11 can be reduced in the tapered sections 13 from, for example, 16' to 4' within 140-180 degrees of rotation of the helix, for example within 165 degrees of rotation.

The helical turbine blade 11 preferably has a 45° pitch, although it will be appreciated that any suitable pitch may be used. The turbine can be supplied in sections of 45° arc or 90° arc that can be assembled together and locked onto the central shaft 14, producing a smooth helical spiral. This permits assembly of the auger 10 on site to suit the intended application and desired size of the energy capturing zone. Typically, a completed auger 10 will have 360° of arc, but of course more or fewer turns of the helix may be used in different applications by adding fewer or more sections.

The auger 10 is designed to rotate relatively slowly with the tidal flow, and the large size and smoothly curved edges allow marine life such as fish to safely move around the blade without becoming trapped or injured. The flange 12 allows the auger to capture water flows coming from various directions to help turn the auger 10 even with a slow flow or if the flow comes from a non-ideal direction.

The central shaft 14 of the auger 10 is hollow, through which an axle shaft can extend. With a 16' diameter auger, the shaft 14 can have a diameter of 18" although of course any suitable size can be employed. The axle shaft can be connected at either end to one or more nose cones 16, and allows the auger 10 to rotate on bearings. The nose cones 16 can be connected by mooring cables 18 to anchors (not shown) that can anchor the auger 10 to the seabed or to joints tethered to an oil rig leg or other securing structure. The nose cones 16 can be provided adjacent to the tapered terminal sections 13 where the diameter of the auger 10 is reduced, in order to prevent pinch points between the auger and nose cone 16.

Figure 6:
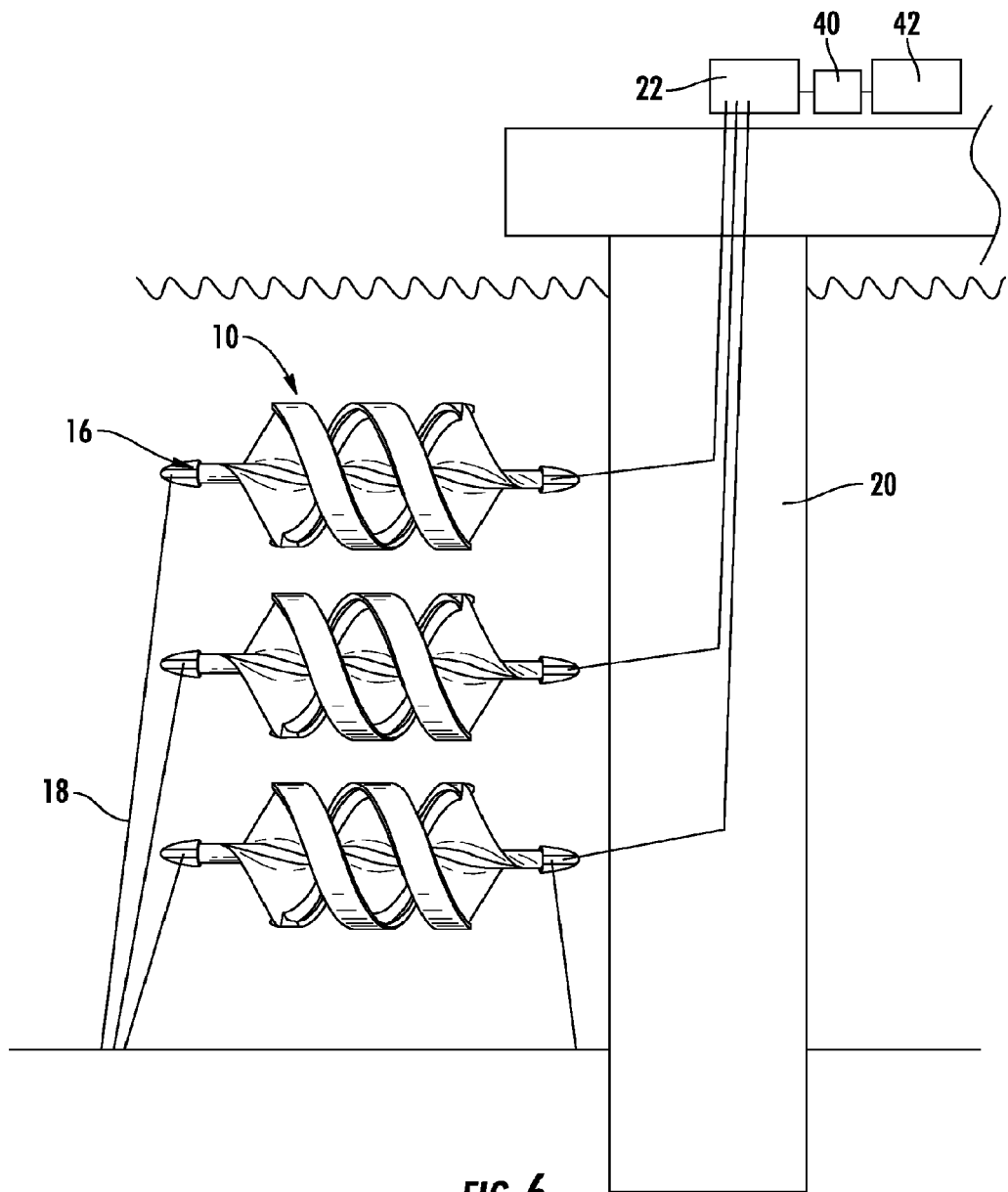
FIG. 6 is a schematic view showing a plurality of tapered helical augers connected to a sea platform having a hydraulically driven electrical generator.

The augers 10 can be anchored in any suitable manner (such as by cables, tether, fasteners, etc.) to any suitable support structure. In one embodiment, the auger can be secured to the legs of an oil rig 20, as shown in FIG. 6. A plurality of augers can be distributed in any suitable manner on the rig 20. The augers can be submerged at a sufficient depth in a body of water so that they are away from floating debris, trees, logs, ice, etc. In some arrangements, the augers 10 can be tethered in place at depths of approximately 8'-10' below the lowest tides, to avoid floating debris. The augers 10 can be oriented generally horizontally, and can be oriented with their central shaft 14 approximately parallel to the tidal or river flow for maximum energy capture. The augers can be adapted to allow for changes in the vertical level of the water in which they are submerged, and can capture tidal flow without horizontal orientation as other tidal generators must do to always be in the same direction with respect to the water flow. To that end, each auger 10 can include horizontal stabilizers with computer controlled ailerons to hold the auger horizontal and parallel to the tidal flow.

The rotation of the augers can be transmitted to power a hydraulic pump, which can generate high pressure oil that can be used for any suitable purpose. The system can be adapted so that water flow in either direction can operate the auger and can store energy in an accumulator, as shown particularly in FIGS. 7-9. During high flow periods, water flow will turn the auger 10. The rotation of the auger can be transmitted to operate the pump, which, in turn, will store hydraulic energy in the accumulator. During low flow periods, the stored energy in the accumulator can be released to continue the steady operation of the electric generator.

The accumulator can function as follows. During water flow, rotation of the augers 10 can be transmitted, such as by gears, to operate a high pressure hydraulic pump such as a stationary pressure compensated variable volume hydraulic motor/pump 30 that can be located in the stationary tethered nose cone assembly 16 with all necessary radial and thrust bearings also housed in the nose cone. In some arrangements, a planetary gearing system 31 can be provided inside the nose cone 16 or another part of the auger 10 to increase the relatively low speed of revolutions per minute of the auger 10 to a level of RPM that can be efficiently used to power the pump 30. The pump 30 can be in fluid communication with an air-fluid accumulator 32, and can be bi-directional to maintain a constant high pressure of hydraulic oil at all speeds irrespective of whether it is accelerating or decelerating or reversing during the cyclic tidal flow. This can be accomplished by a series of criss-cross check valves 34 on a hydraulic circuit 36.

Figure 7A:
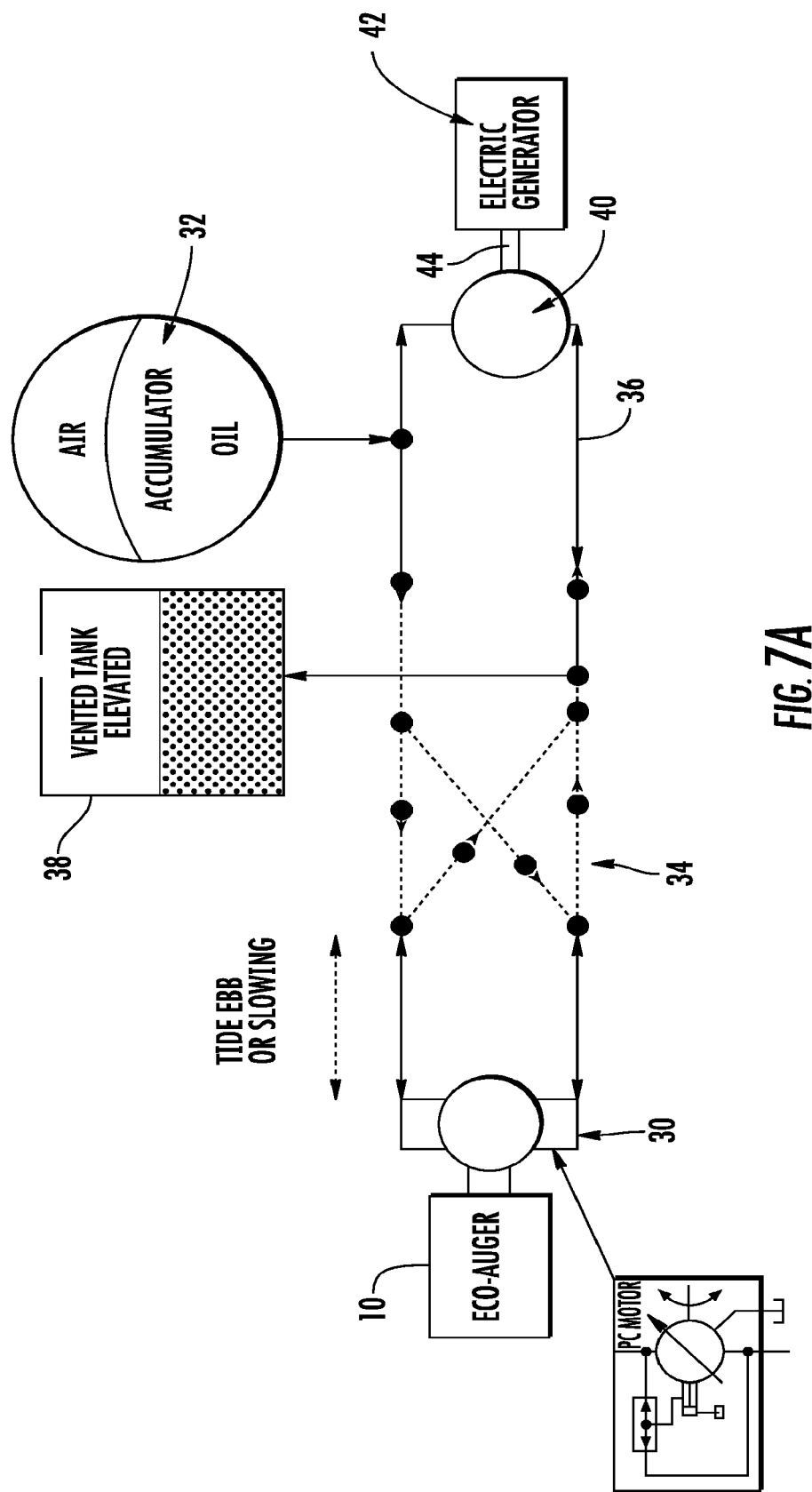
FIGS. 7a, 7b and 7c are schematic representations of an arrangement of a hydraulic circuit for a hydrokinetic system according to arrangements of the invention.

Referring to FIG. 7 in particular, a vented elevated hydraulic fluid storage tank 38 can be supplied to store oil or other hydraulic fluid. It is preferred that all hydraulic fluid is water based and non-flammable so that any leakages in the system due to debris impact will not create a danger or an oil spill. When the tidal flow is ebbing or slowing, such as shown in FIG. 7A, the auger 10 is not moving, or is moving too slowly to generate electricity. In this instance, a system controller causes the criss-cross check valves 34 to be closed so that hydraulic fluid flows from the air-fluid accumulator 32 through fixed displacement hydraulic piston motors 40 without flowing through the pump 30. The high pressure in the air-oil accumulator 32 causes fluid to be propelled through the hydraulic circuit 36. The hydraulic piston motors 40 can drive an electric generator 42 via a shaft 44. A suitable hydraulically driven electric generator may be similar to those currently used on emergency vehicles such as fire trucks. During the ebb tide or slower tidal flows, the accumulators 32 release their stored high pressure fluid to drive the electrical generators 42 at their steady output requirements. Fluid then circulates further through the hydraulic circuit 36 to the oil/fluid storage tank 38.

Figure 7B:
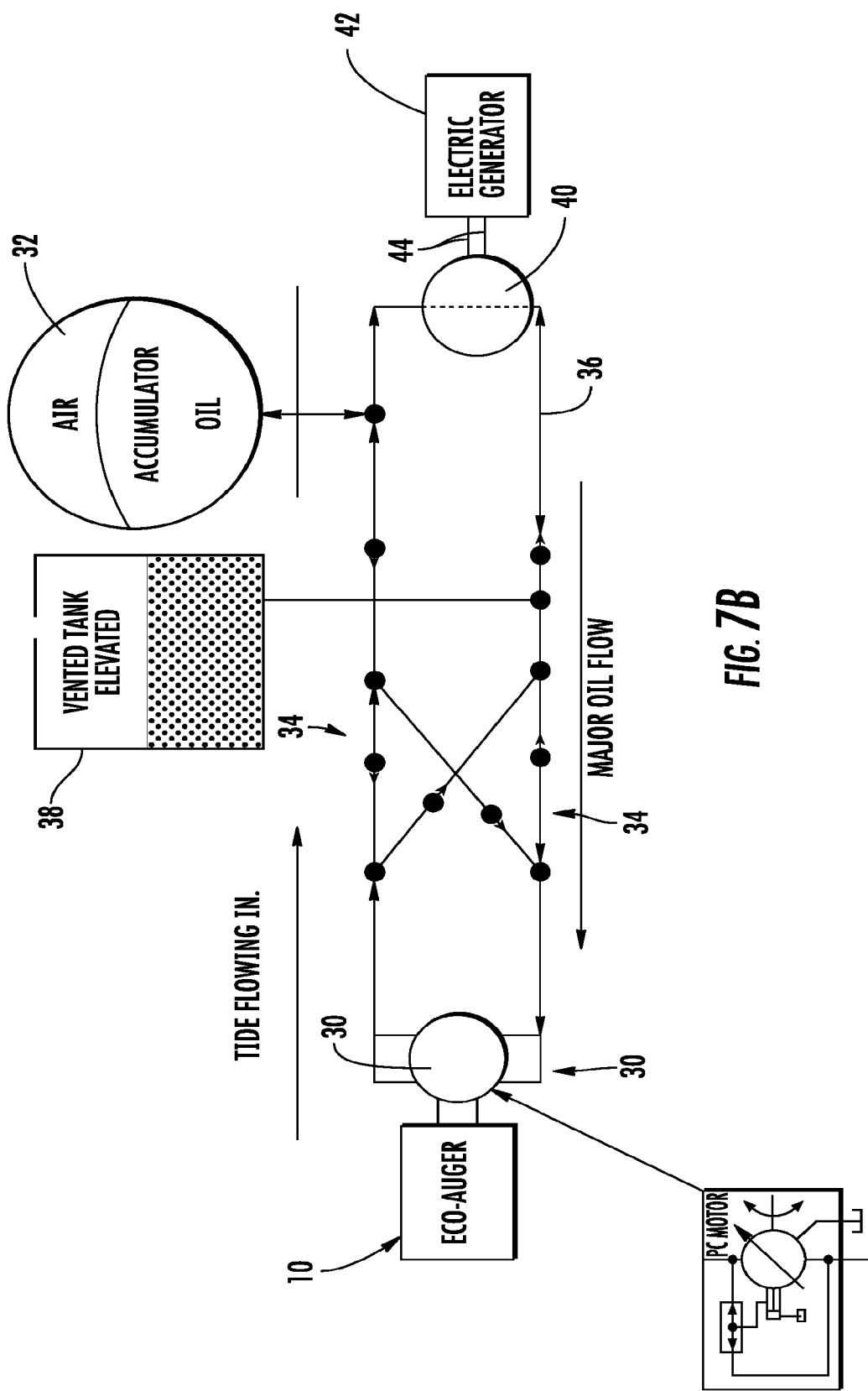
Figure 7C:
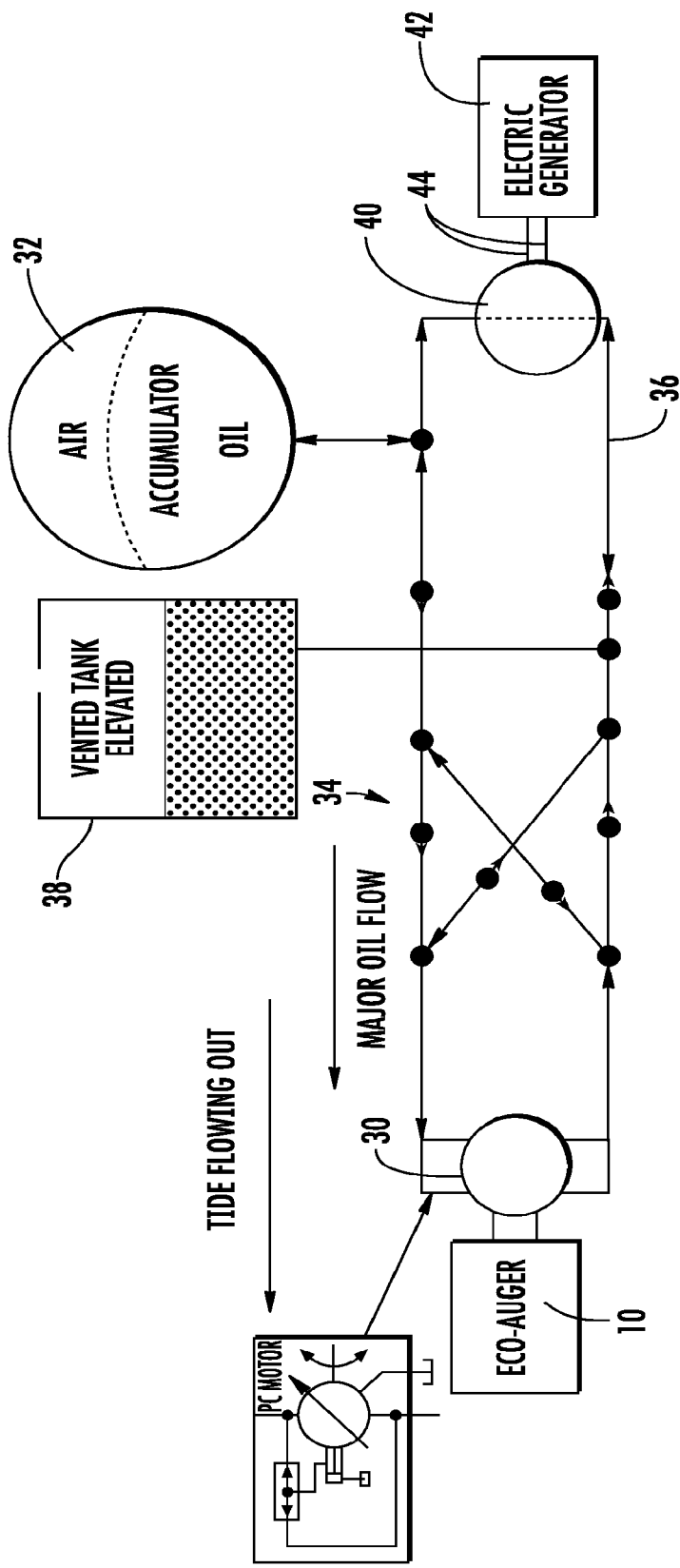

At full or maximum tidal flow, such as shown in FIG. 7B, the output volume of the pump 30 can be set larger than the volume of steady flow required by the generator 42. The system controller opens some of the criss-cross valves 34 to open the hydraulic circuit 36 through the pump 30 that is driven by the auger 10, with the hydraulic fluid flowing in one direction. The excess volume of fluid over the generator's flow requirement automatically flows to the air-fluid accumulator 32 for energy storage, and builds up the pressure inside the accumulator 32. Hydraulic fluid may be released from the storage tank 38 via a one-way valve, to ensure that a sufficient volume of fluid is always present in the circuit 36. Multiple accumulators 32 of various sizes can be connected in parallel, enabling adequate energy storage. When the tide has reversed direction, such as shown in FIG. 7C, going through the ebb flow valve arrangement, the system controller detects when maximum flow is reached again. The criss-cross valves 34 are operated so that the flow in hydraulic circuit 36 through the pump 30 is reversed and can thus be driven by the auger 10 rotating with the reversed tidal flow, while the flow through the hydraulic piston motors 40 remains in the same direction.

Figure 8:
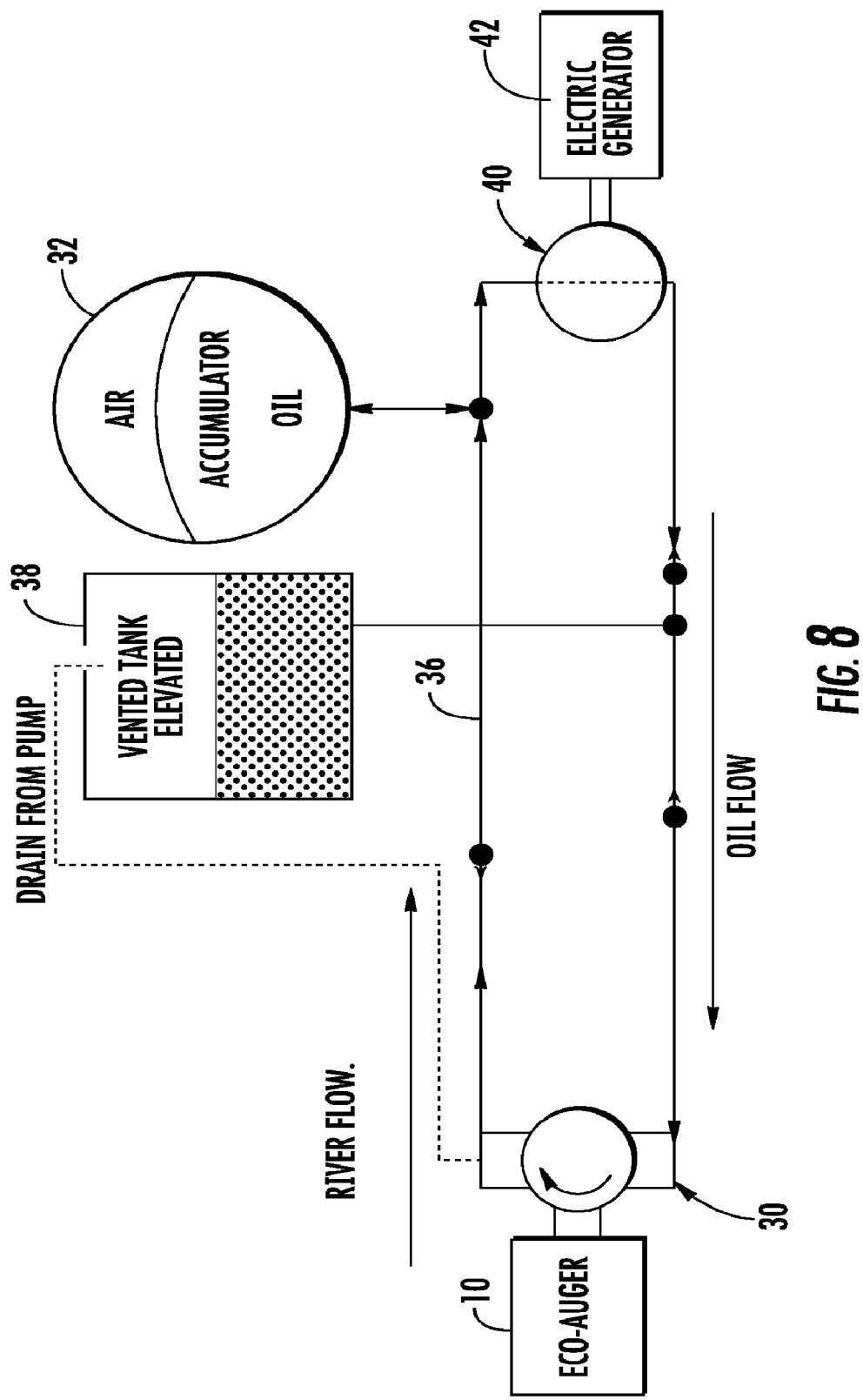
FIG. 8 is a schematic representation of another arrangement of hydraulic circuits for a hydrokinetic system according to arrangements of the invention.
Figure 9:
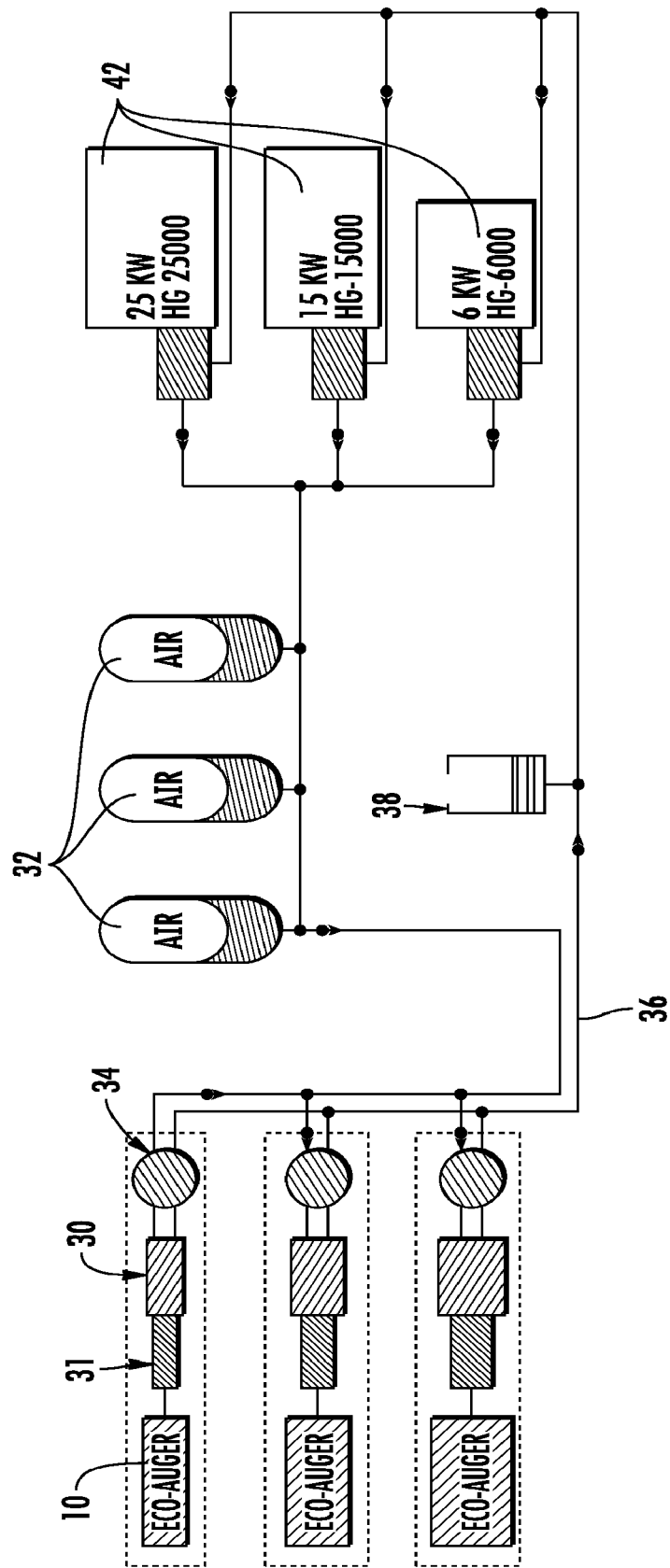
FIG. 9 is a schematic representation of a hydrokinetic system according to arrangements of the invention.

In river locations, as illustrated in FIG. 8 in particular, the pump 30 can be mono-directional and can pump consistent and constant pressure hydraulic fluid in one direction only to the accumulators 32. In river applications, therefore, criss-cross check valves 34 are not required.

Each location thus requires a study to determine the maximum and minimum tidal flow at peak tidal motion, or the size of the river current, in order that the appropriate number, arrangement and sizes of accumulators are used. A computer system can control the accumulators and generators to provide the greatest efficiency in energy generation.

In an exemplary arrangement, in the Cook Inlet, in Alaska, the tides are have a mean diurnal range of 15-28 feet and change every six hours. A 16 ft diameter auger of carbon fiber material can be submerged into the flow below the ice pack which forms in the winter. The augers 10 can be attached to oil platforms in the inlet. Most platforms have 3 or 4 legs, and thus if 4 augers are attached to each leg this enables 12-16 augers to be run simultaneously. The auger 10 can turn on a stationary hollow shaft on sealed bearings to turn a gear box and through a planetary gear system, similar gearing that drives the propeller at the speed of a jet prop airplane engine. This can turn a high pressure hydraulic pump. During the maximum flow periods of four to five hours, this system can pressure up the air-oil accumulator 22. As the flow slows for roughly one hour, the pressured storage of hydraulic oil can continue to turn the hydraulic turbine electric generator. The system is bi-directional, accomplished with crisscross check valves, so that power is stored to the accumulator 22 in either water flow direction. The system can be cable tethered parallel to the tidal flow for maximum energy capture. In deeper water, it is possible to attach a number of the units 10 around the platform 20, arranged up each of the platform legs, evenly staked vertically one over the other.

The gear-driven hydraulic pumps can be located in the nose cone 16 closest to the platform 20. The oil lines are tethered to the platform legs and extend up to the accumulator 22 on the upper platform deck. This will protect them from damage by debris, because the units can be tethered a minimum of 10-15 ft under the surface of the water. Actual electricity generation can be up on the platform 20, out of the ocean water. The tethering system allows for a vertical water level change with the tide. The horizontal stabilizers can have computer control ailerons similar to airplane wings to hold the augers horizontally, and parallel to the tidal flow.

In other arrangements, the augers 10 can be placed on bridge pilings that are either positioned in tidal flow areas or in rivers. In other arrangements, the augers 10 can be used on decommissioned oil rigs to provide power generation that can be transmitted onshore via cables. This can prolong the useful life of oil platforms even after drilling is no longer economically feasible. In yet further arrangements, floating pontoon bridges can be used to tether the augers 10. Each installation (bridge, oil platform, pontoon bridge, etc) can in addition have one or more wind generators mounted above the water to provide additional generation capacity to the installation.

I. Exemplary Multi-Piece Auger

The turbine blade may comprise a number of pieces. The turbine blade may have a number of similar or substantially similar interior pieces, and similar or substantially similar end pieces. Each interior section may have a similar radial arc of travel, such as 45, 60, 90, 120, or 180 degrees. Each interior section may be configured to interlock smoothly with adjoining interior and exterior sections. The areas of interlocking or interconnection among adjacent sections may be smooth and non-overlapping between sections. As a result, the disruption and/or turbulence to the flow of fluid flowing over the completed auger may be minimized. For instance, the end or edge of an interior section may abut with the corresponding end or edge of an adjacent interior section or an exterior/end section in a non-overlapping manner.

In one embodiment, preferably, the turbine blade may comprise six or more approximately 90 degree sections. The sections may be rotational molded with identical center sections. The turbine blade may include two identical tapered end sections. All of the sections may be registered and interlocked to be mounted upon a common stainless steel core or other central shaft. Other embodiments with additional, fewer, or alternate components may be used.

Figure 10:
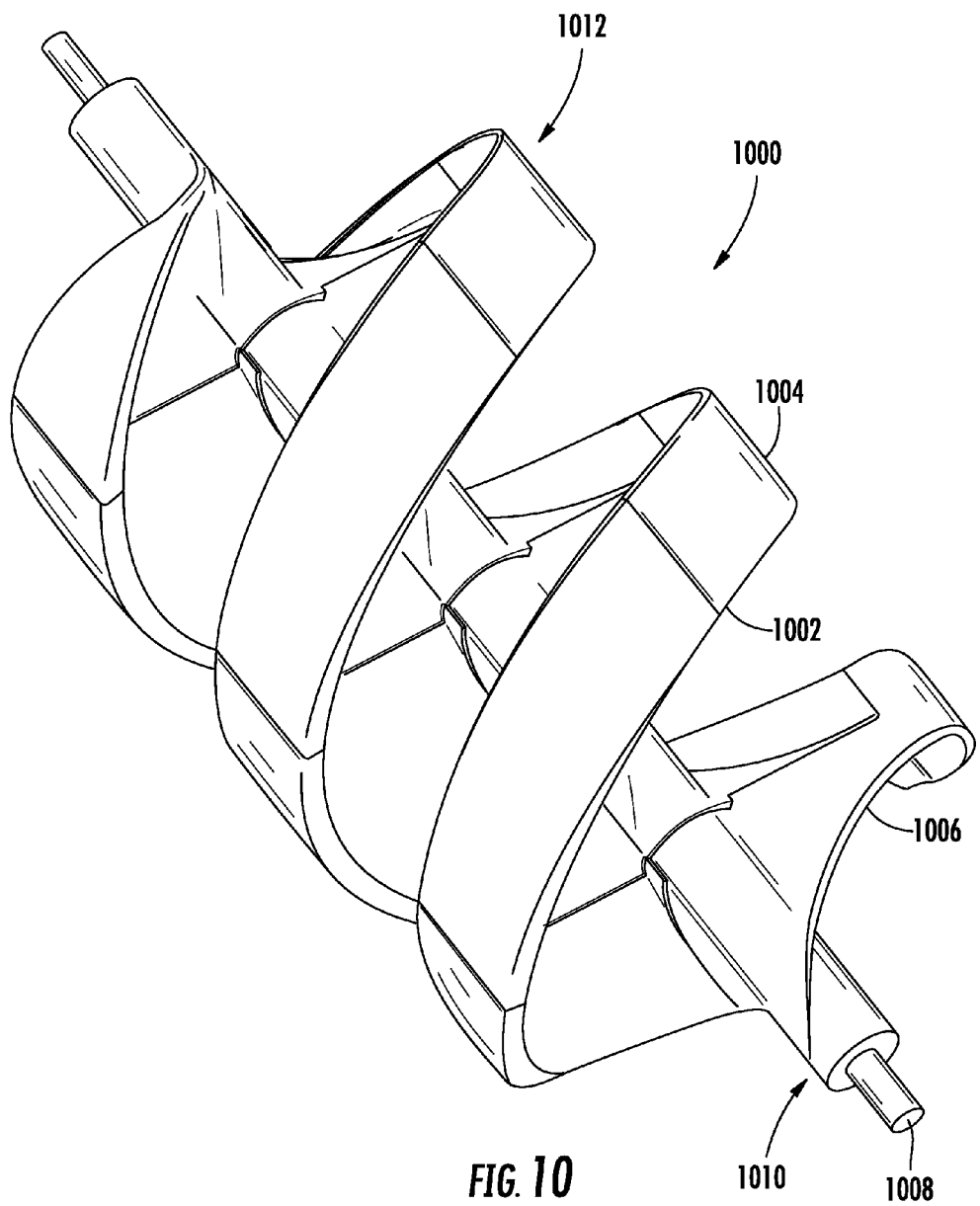
FIG. 10 is an exemplary helical multi-piece auger having multiple radial and interlocking sections.

FIG. 10 is an exemplary helical multi-piece auger 1000 having multiple radial and interlocking sections. The multi-piece auger 1000 may have a number of interior sections 1002. Each interior section 1002 may have an auger blade with a degree of lift, such as between approximately 30 and approximately 60 degrees of lift with respect to the longitudinal axis of the central shaft 1008, and cover a range of a radial arc moving circumferentially around the center shaft 1008. The center shaft 1008 may have a circular or cylindrical exterior as shown.

Each interior section 1002 and exterior section 1006 may be configured to be slid onto the center shaft 1008 during assembly. Each interior section 1002 or exterior section 1006 may have a central portion or section 1010 configured and sized to be accepted the center shaft 1008, via either a clearance or interference fit.

For instance, each interior section 1002 or exterior section 1006 may have a central portion 1010 having a hollow cylindrical interior sized to accept the center shaft 1008. The hollow cylindrical interior may form a clearance fit with the center shaft 1008 to provide for rotation of the interior sections 1002 and exterior sections 1006 around a stationary center shaft 1008 during use. Alternatively, the interior sections 1002 and exterior sections 1006 may form an interference fit or be otherwise fastened to a rotational central shaft 1008, such that the interior sections 1002, the exterior sections 1006, and the central shaft 1008 all rotate in unison during use. Other configurations and interconnections may be used.

The interior section 1002 may be interlocked or interconnected with both adjacent interior sections 1004 and/or an exterior or end section 1006. The interior sections 1002, 1004 and exterior sections 1006 may all cover a radial arc around the central shaft 1008. For example, the radial arcs may extend for approximately 15, 20, 30, 45, 60, 90, 120, 135, or 180 degrees around the central shaft 1008. In one embodiment, the interior sections 1002, 1004 may each cover a radial arc of approximately 90 degrees. The exterior sections 1006 may cover a radial arc that is smaller than that covered by the interior sections 1002, 1004. In one embodiment, the exterior sections 1006 may cover a radial arc of approximately 45 degrees. Alternate radial arcs may be used, including those discussed elsewhere herein.

As shown in FIG. 10, the auger sections 1002, 1004, and 1006 may be mounted on the central shaft 1008. After assembly, the turbine blade may be configured to be rotatable by a moving fluid, either by itself or along with the central shaft 1008. Each of the auger sections 1002, 1004, and 1006 may include an outer spiral flange 1012 extending approximately perpendicularly from an outer edge of each of the interior and exterior auger sections 1002, 1004, and 1006. The outer spiral flange 1012 may be configured to capture at least a percentage of an energy of the moving fluid. The interconnections of each outer spiral flange of adjacent auger sections 1002, 1004, and 1006 may be aerodynamic or smooth to reduce turbulent flow and/or flow disruptions. The edges of each outer spiral flange of adjacent sections 1002, 1004, and 1006 may be substantially flush or even with one another, and may interconnect in a non-overlapping manner, as shown in FIG. 10. Other interconnections may be used.

In one embodiment, the helical multi-piece auger may include an interior section having a first helical portion and a first central portion. The first helical portion may be configured to have (1) between approximately 15 degrees and approximately 60 degrees of angled movement with respect to a longitudinal axis of a central shaft, and (2) a first radial arc extending between approximately 45 degrees and approximately 180 degrees circumferentially around the central shaft. The first central portion may have a first cylindrical opening of a first inner diameter.

The helical multi-piece auger may further include an exterior section having a second helical portion and a second central portion. The second helical portion may have a second radial arc extending between approximately 30 degrees and approximately 90 degrees circumferentially around the central shaft. The exterior section may have a second central portion having a second cylindrical opening of a second inner diameter. The central shaft may be configured to have a cylindrical exterior having an outer diameter. The outer diameter of the central shaft may be approximately equal to or less than both the first inner diameter of the first central portion and the second inner diameter of the second central portion such that the interior and exterior sections are sized to be mounted onto the central shaft. The interior and exterior sections may be configured to non-overlappingly interconnect with each other such that the first helical portion of the interior section and the second helical portion of the exterior section are non-overlapping and substantially flush or even with one another. The interconnected interior and exterior sections may form at least a portion of the helical multi-piece auger that is rotatable by a moving fluid to facilitate generation of energy from the rotation of the helical multi-piece auger. Further, the second cylindrical opening of the second central portion of the exterior section may be sized substantially similar to the first cylindrical opening of the first central portion. Other configurations may be used.

Exemplary Section Method of Manufacture and Assembly

The helical turbine blade may be manufactured in sections. Each section may be manufactured to be substantially similar and have a 45 degree pitch or other pitch. Each section may be manufactured to have a radial arc of approximately 15, 20, 30, 45, 60, 90, 120, 135, 180, or other degrees. Each section may be manufactured to have a cylindrical center piece that may be slid onto either a stationary or rotating central shaft during assembly.

The sections may be assembled together and locked onto the central shaft 14, producing a smooth helical spiral. The individual sections may permit shipping and assembly of the auger 10 on-site and to suit the intended application and desired size of the energy capturing zone. Typically, a completed auger 10 will have 360 degrees of arc, but more or fewer turns of the helix may be used in different applications by adding fewer or more sections.

Figure 11:
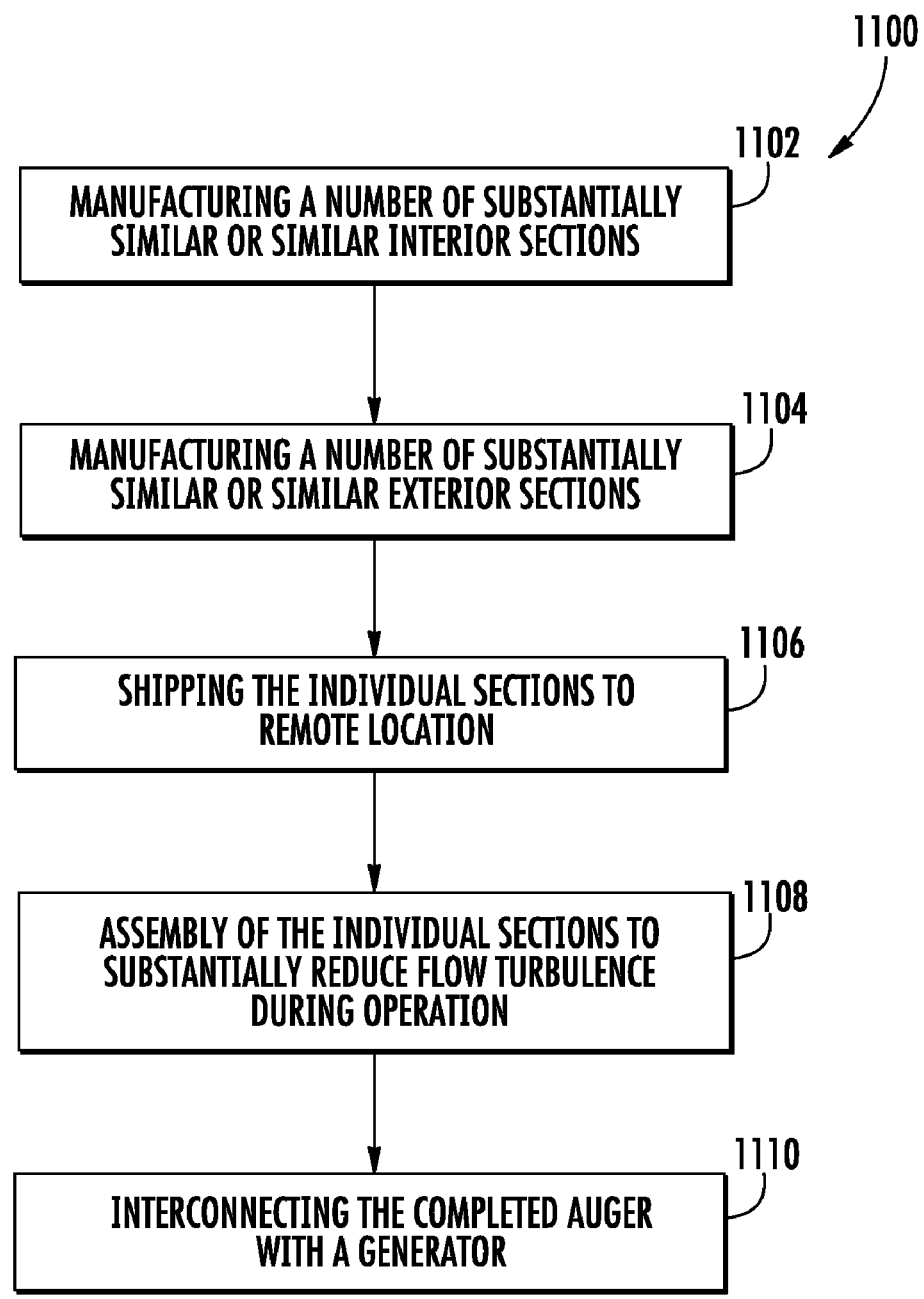
FIG. 11 is an exemplary method of manufacturing and assembly of the helical multi-piece auger.

FIG. 11 is an exemplary method of manufacturing and assembly of the helical multi-piece auger 1100. The method 1100 may include manufacturing a number of substantially similar or similar interior sections 1102, manufacturing a number of substantially similar or similar exterior sections 1104, shipping the individual sections to a remote location 1106, assembly of the individual sections to substantially reduce flow turbulence during operation 1108, and interconnecting the completed auger with a generator 1110. The method may include additional, fewer, or alternative actions.

The method 1100 may include manufacturing a number of substantially similar or similar interior sections 1102. The helical multi-piece auger may comprise several interior sections that are rotational molded and that may have identical central portions. The radial are of each of the several interior sections may extend between approximately 45 degrees and approximately 180 degrees, preferably approximately 90 degrees, circumferentially around the central shaft. Each interior section may include a helical portion having between approximately 15 degrees and approximately 60 degrees of angled movement with respect to a longitudinal axis of a central shaft. Other radial areas and helical portions may be used, and other forms of molding and manufacture may be used.

The method 1100 may include manufacturing a number of substantially similar or similar exterior sections 1104. The helical multi-piece auger may have two exterior or end sections having a tapered outer spiral flange approximately perpendicular to a helical portion. The tapered outer spiral flange may be configured to capture at least a portion of an energy of the moving fluid. The helical portion may be configured to have between approximately 5 degrees and approximately 60 degrees of angled movement with respect to the longitudinal axis of the central shaft. The helical portion may have a radial arc extending between approximately 30 degrees and approximately 90 degrees circumferentially around the central shaft.

The method 1100 may include shipping the individual sections to a remote location 1106. In one embodiment, the interior and exterior sections may have a diameter of eight feet or more, and the fully assembled auger may have a length of 20 feet or longer. Thus, the size of the fully assembled auger may hinder transportation. However, manufacturing the auger in the sections described herein may facilitate the shipment of individual interior and exterior sections, as well as generator and other components, to locations around the world, and their subsequent assembly on-site.

The method 1100 may include assembly of the individual sections to substantially reduce flow turbulence during operation 1108. Several interior sections may be non-overlappingly interconnected such that adjoining surfaces are substantially flush with one another to alleviate and/or reduce turbulence associated with the moving fluid flowing over surfaces of the helical multi-piece auger after assembly and during use. Further, each interior section may have an outer spiral flange approximately perpendicular to the first helical portion. Each outer spiral flange may be configured to capture at least a portion of an energy of the moving fluid.

The method 1100 may include interconnecting the completed auger with a generator 1110. The helical multi-piece auger may be either directly or indirectly interconnected with a generator such that the rotation of the central shaft and/or the helical multi-piece auger by the moving fluid generates energy. For instance, the interior sections may be firmly fastened to a rotating central shaft, such as via bolts or screws. The two ends of the central shaft may drive or be interconnected with a generator. In one embodiment, the two ends of the central shaft may be interconnected with generator rotors that rotate as the central shaft and/or the helical multi-piece auger rotates. The generator rotors may interact with stationary stators to generate power. Alternatively, the interior sections may be rotatably mounted onto the central shaft and the interconnected interior (and/or exterior) sections (i.e., the fully assembled helical multi-piece auger) may be interconnected with or drive an electrical generator or components thereof. Other configurations to generate energy from the rotation of a rotatable central shaft or the fully assembled helical multi-piece auger around a stationary central shaft may be used to generate power.

In one embodiment, the method of assembling a helical multi-piece auger may include mounting two or more interior sections each having a first helical portion and a first central portion onto a central shaft having a cylindrical exterior with an outer diameter. The first helical portion of each of the two or more interior sections may be configured to have a first radial arc extending between approximately 45 degrees and approximately 180 degrees circumferentially around the central shaft. The first central portion of each of the two or more interior sections may be configured to have a first cylindrical opening of a first inner diameter. The first inner diameter of the two or more interior sections may be approximately equal to or greater than the outer diameter of the central shaft such that the two or more interior sections are sized to be mounted onto the central shaft.

The method of assembly may further include interconnecting the central shaft and/or helical multi-piece auger after assembly with a generator configured to generate energy from the rotation of the central shaft and/or helical multi-piece auger caused by a moving fluid acting on the two or more interior sections mounted on the central shaft. The two or more interior sections may be configured to non-overlappingly interconnect with each other such that adjoining surfaces of adjacent ones of the two or more interior sections are flush with one another to reduce turbulent flow of the moving fluid moving over the first helical portion of the two or more interior sections. The interconnected two or more interior sections may form at least a portion of the helical multi-piece auger that is rotatable by the moving fluid to facilitate generation of energy via the interconnected generator.

The method may further include mounting an exterior section having a second helical portion and a second central portion onto the central shaft adjacent to one of the two or more interior sections. The second helical portion may have a second radial arc extending between approximately 30 degrees and approximately 90 degrees circumferentially around the central shaft, and the exterior section may have a second central portion having a second cylindrical opening of a second inner diameter. The second inner diameter may be approximately equal to or greater than the outer diameter of the central shaft such that the exterior section is sized to be mounted onto the central shaft.

The interior and exterior sections may be non-overlappingly interconnected such that the outer spiral flange of one interior section and the tapered outer spiral flange of an adjacent exterior section may not overlap and may be flush or substantially flush with each other. Likewise, the outer spiral flanges of adjacent interior sections may not overlap and may be flush or substantially flush with each other after assembly. In other words, in one embodiment, the interior section may have an outer spiral flange approximately perpendicular to the first helical portion, and the exterior section may have a tapered outer spiral flange approximately perpendicular to the second helical portion. The interior and exterior sections may be configured such that an edge of the outer spiral flange and an adjoining edge of the tapered outer spiral flange are substantially even or otherwise flush with one another after the interior and exterior sections are non-overlappingly interconnected.

Figure 12:
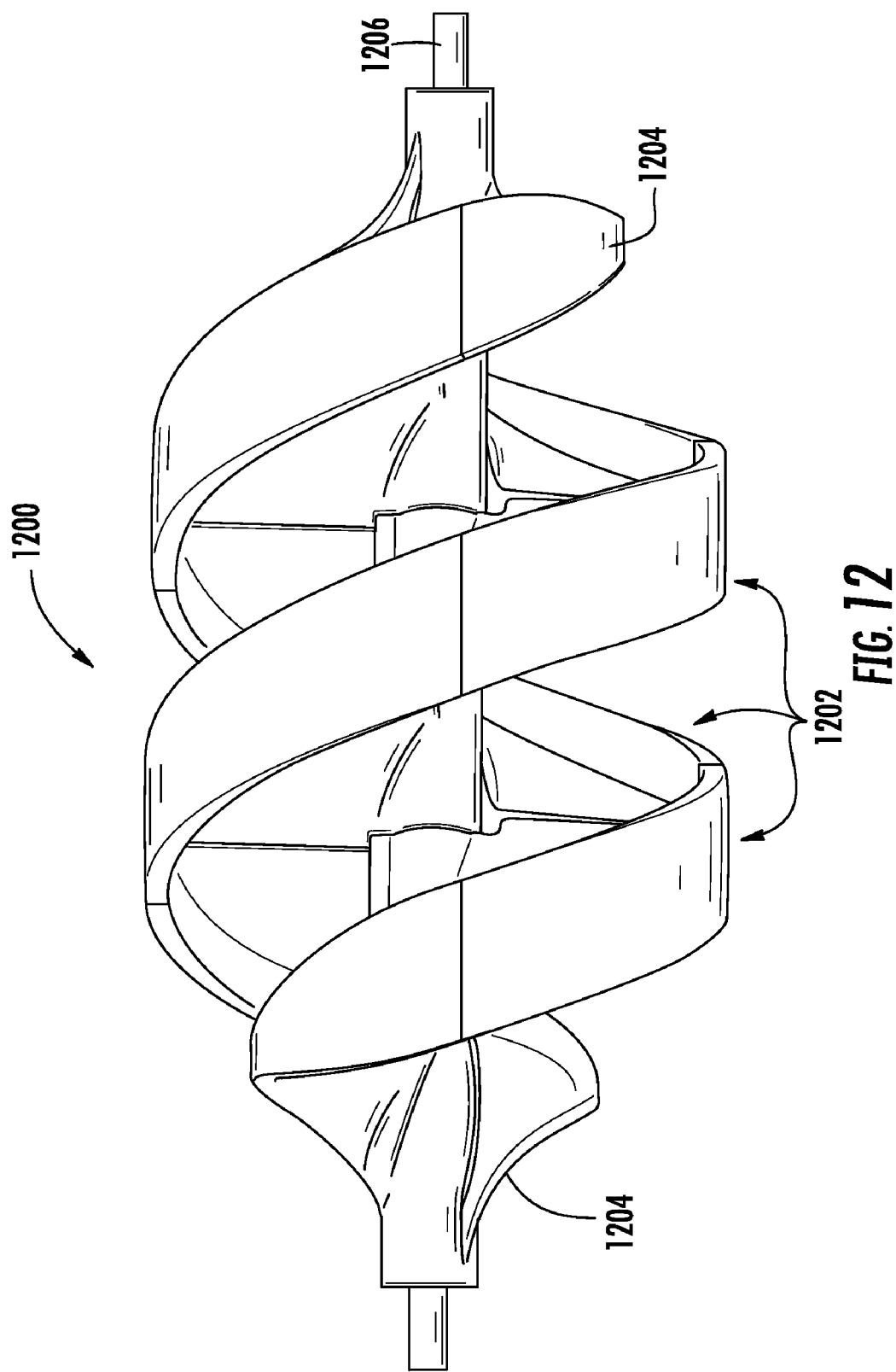
FIG. 12 is a different perspective of the exemplary helical multi-piece auger having multiple radial and interlocking sections.

FIG. 12 illustrates a different perspective of the exemplary helical multi-piece auger 1200 having multiple radial and interlocking interior sections 1202. The helical multi-piece auger 1200 may include multiple interior sections 1202, two tapered end sections 1204, and a central shaft 1206. The helical multi-piece auger 1200 may include additional, fewer, or alternate components.

The interior sections 1202 and tapered end sections 1204 may be interconnected with and/or interlocked with adjacent interior and/or end sections. The interior sections 1202 and tapered end sections 1204 may be manufactured using an injection molded or other process. The interior and end sections 1202, 1204 may be molded to interlock together on the central shaft 1206 and to efficiently transfer the torque generated by a moving medium traveling over the surfaces of the auger 1200 to the central shaft 1206, driving a hydraulic system, generator, or other system. For instance, the interior and end sections 1202, 1204 may be interconnected, and one or more of the sections 1202, 1204, such as the tapered end sections 1204, may be bolted or otherwise affixed to the rotatable central shaft 1206. The rotation of the central shaft 1206 may in turn drive a hydraulic system, generator, or other device.

Figure 13:
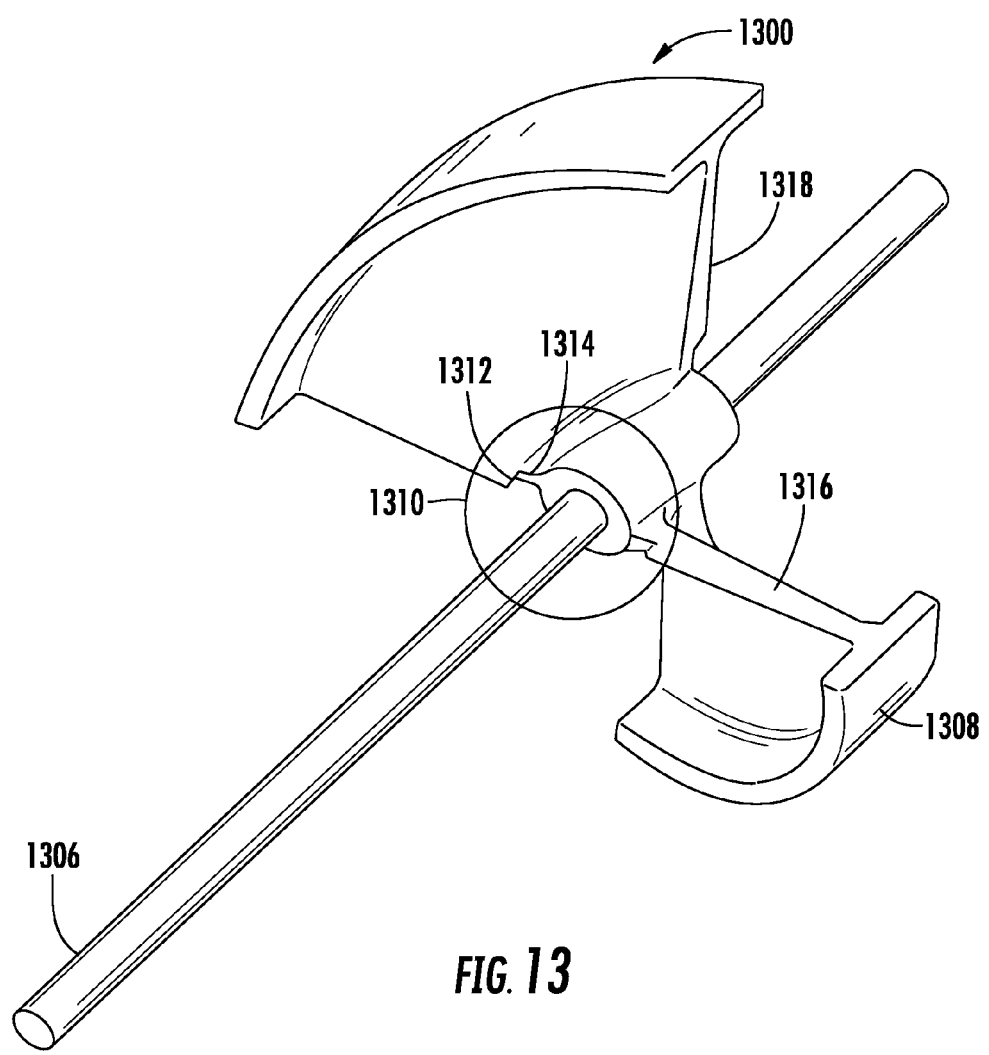
FIG. 13 is an exemplary radial and interlocking interior section of the helical multi-piece auger of FIG. 12.

FIG. 13 is an exemplary radial and interlocking interior section 1300 of a helical multi-piece auger. Each interlocking interior section 1300 may be mounted on a central shaft 1306. For instance, each interior section 1300 may be configured to be slid onto the central shaft 1306 during assembly. Each interior section 1300 may form clearance fits with the central shaft 1306 to provide for rotation of the interior section 1300 around the central shaft 1306.

Each interior section 1300 may have approximately 180 degrees of helical arc around the central shaft 1306. Alternatively, each interior section 1300 may have approximately 90 degrees or greater of helical arc around the central shaft 1306. Smaller or larger ranges of degrees of helical arc around the central shaft 1306 may be used.

Each interior section 1300 may have an outer flange 1308. The outer flange 1308 may be configured to capture a portion of the energy of a moving fluid, as well as to protect sea life from sharp edges of the auger. Each interior section 1300 may have an interlocking area 1310 comprising one or more surfaces 1312, 1314 configured to interlock and/or smoothly mate with corresponding surfaces on an adjacent interior section 1300 or tapered end section during assembly. The surfaces 1312, 1314 may be substantially flat and smooth, and at an approximately 90 degree angle with respect to one another.

One or more other surfaces 1316, 1318 of the interior section 1300 may be configured to interlock and/or smoothly mate with corresponding surfaces on an adjacent interior section or tapered end section. The surfaces 1316, 1318 may be substantially smooth and flat. Surfaces having additional, fewer, or other characteristics may be used.

Figure 14:
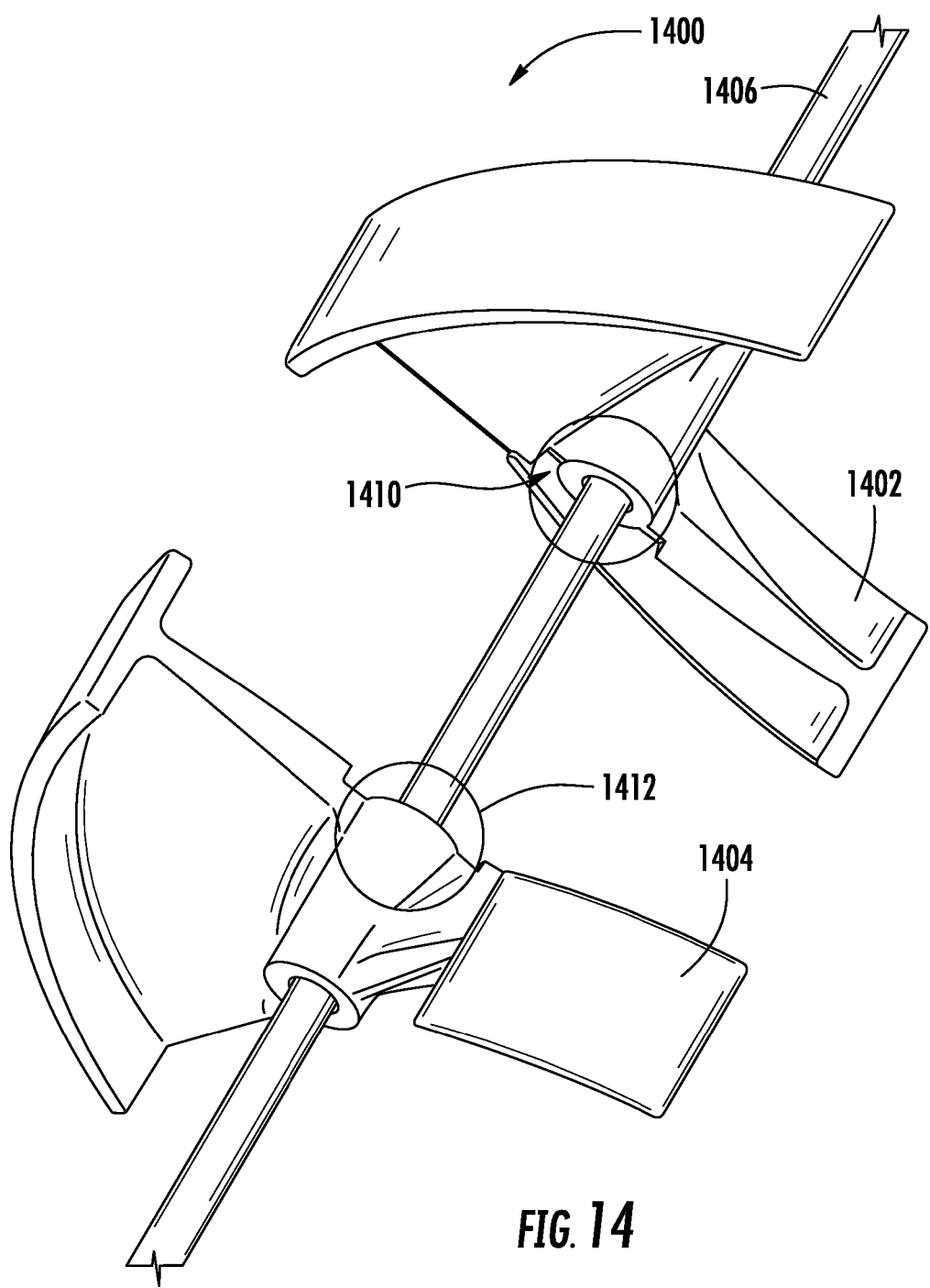
FIG. 14 depicts two exemplary adjacent radial and interlocking interior sections of the helical multi-piece auger of FIG. 12.

FIG. 14 depicts two exemplary adjacent radial and interlocking interior sections 1400 of a helical multi-piece auger. A first interlocking interior section 1402 and a second interlocking interior section 1404 may be slid onto a central shaft 1406 during assembly. Each interior section 1402, 1404 may be sized to form clearance fits with the central shaft 1406 and may be rotatable around the central shaft 1406.

The first interlocking interior section 1406 may have a first interlocking area 1410. The second interlocking interior section 1404 may have a second interlocking area 1412. The first interlocking area 1410 may have one or more surfaces configured to interlock and/or smoothly interconnect with adjoining or corresponding surfaces of the second interlocking area 1412. The interlocking areas 1410, 1412 may each have a number of surfaces configured to correspond with surfaces of the adjacent interlocking area 1412, 1410. The surfaces on adjacent sections 1402, 1404 may be configured to fit together like pieces of a jigsaw puzzle, interconnecting the adjacent sections 1402, 1404 together, either with or without the use of fasteners.

Additional or alternate means of interlocking the first interlocking interior section 1402 and the second interlocking interior section 1404 may be used. For instance, fasteners alone, such as bolts and screws, may interlock adjacent sections (having surfaces configured to smoothly mate with one another) together.

Figure 15:
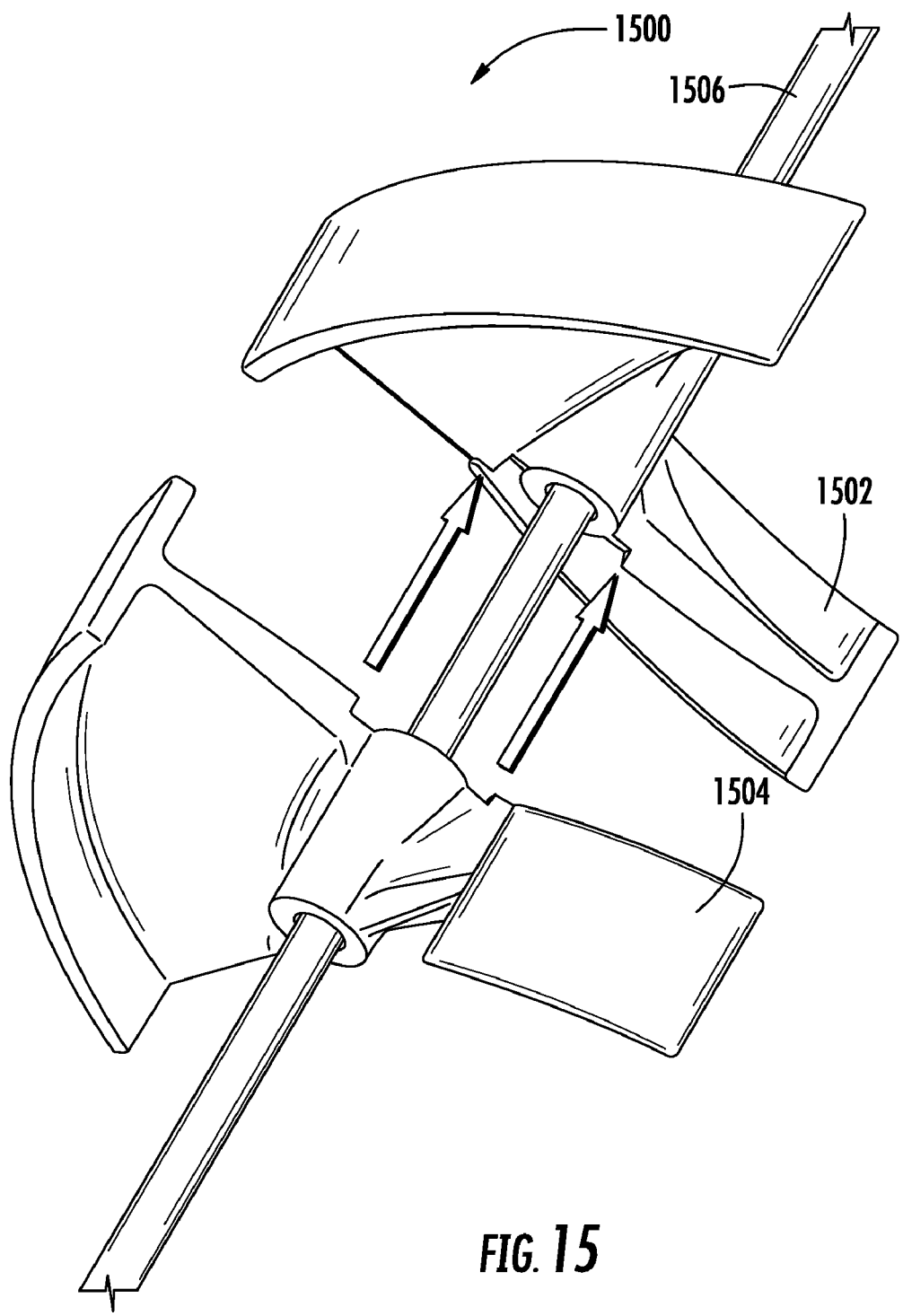
FIG. 15 depicts interconnecting two adjacent radial and interlocking interior sections of the helical multi-piece auger of FIG. 12.

FIG. 15 depicts a center section locking method. FIG. 15 illustrates interconnecting two adjacent radial and interlocking interior sections 1500 of a helical multi-piece auger. During assembly, the second interlocking interior section 1504 may be moved along the central shaft 1506 toward, and then interlocked or otherwise interconnected with, the first interlocking interior section 1502. The surfaces of the first and second interior sections 1502, 1504 may be configured to provide for an approximately smooth exterior surface of the helical multi-piece auger after assembly. As a result, wasteful turbulence of a moving fluid flowing over the completed multi-piece auger may be reduced or minimized.

Figure 16:
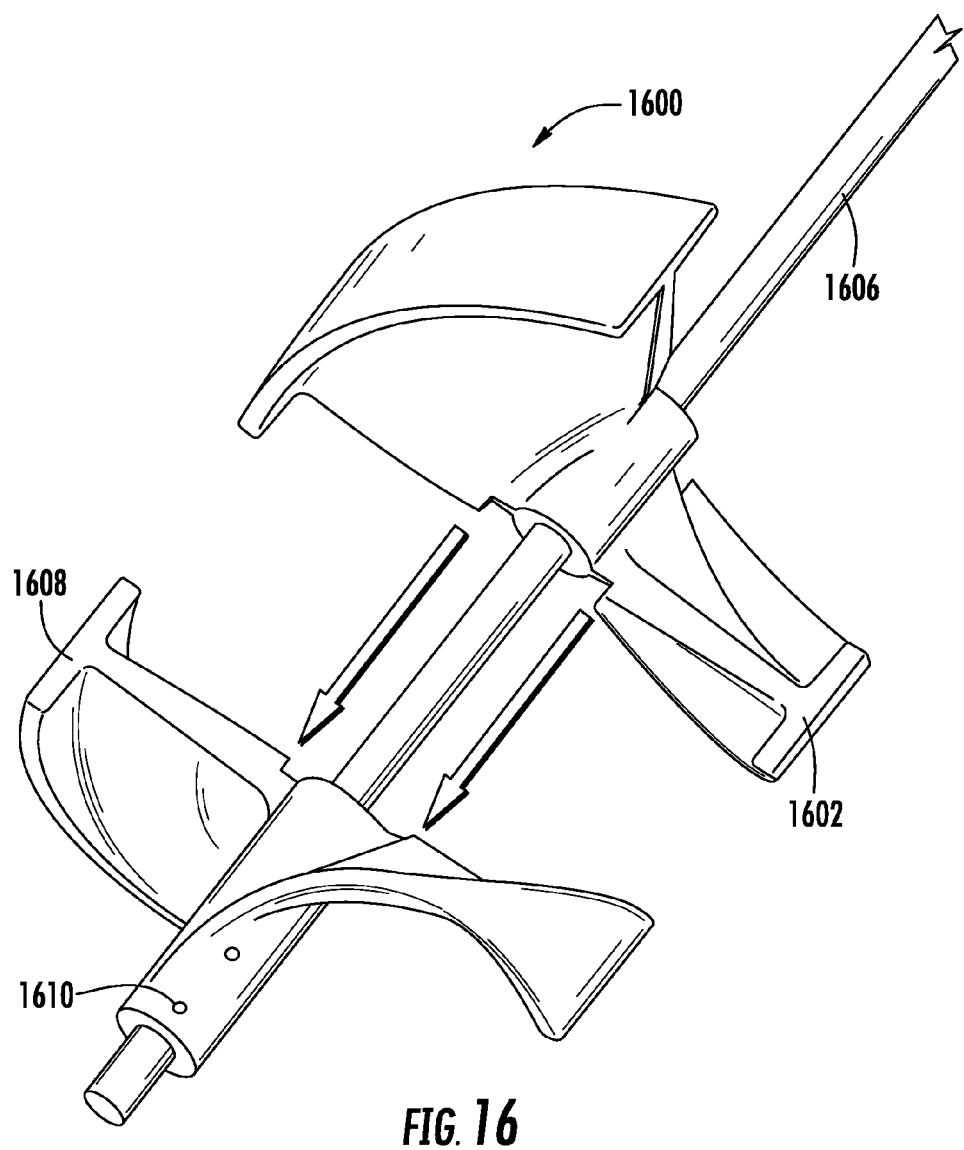
FIG. 16 depicts interconnecting a radial and interlocking interior section with a tapered end section of the helical multi-piece auger of FIG. 12.

FIG. 16 depicts interconnecting a radial and interlocking interior section with a tapered end section of a helical multi-piece auger 1600. As shown, a method of assembly may include locking one or more center sections into a tapered end section that is pinned to the central shaft. During assembly, a tapered end section 1608 may be slid onto the central shaft 1606. The tapered end section 1608 may be firmly affixed to the central shaft 1606, such as via bolts, screws, or other fasteners 1610.

An interior section 1602 that is mounted onto the central shaft 1606 may be moved along the central shaft 1606 and toward the tapered end section 1608. The interior section 1602 and tapered end section 1608 may have corresponding surfaces configured to interlock or otherwise interconnect with each other. The method of assembly may include interlocking several interior sections 1602 and two tapered end sections 1608 together on the central shaft 1606. The interlocking surfaces may be configured to provide an approximately smooth surface of the multi-piece auger to minimize energy loss and maximize energy capture of a moving fluid flowing over the surfaces of the multi-piece auger during use.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A helical multi-piece auger rotatable by a moving fluid for the generation of energy comprising:
    an interior section having a first helical portion and a first central portion, the first helical portion configured to have (1) between approximately 15 degrees and approximately 60 degrees of angled movement with respect to a longitudinal axis of a central shaft, and (2) a first radial arc extending between approximately 45 degrees and approximately 180 degrees circumferentially around the central shaft, and the first central portion having a first cylindrical opening of a first inner diameter;
    an exterior section having a second helical portion and a second central portion, the second helical portion (1) having a second radial arc extending between approximately 30 degrees and approximately 90 degrees circumferentially around the central shaft and (2) tapering inward radially toward the central shaft with approximately 45 degrees of helical pitch with respect to the longitudinal axis of the central shaft, the second central portion having a second cylindrical opening of a second inner diameter; and
    the central shaft configured to have a cylindrical exterior having an outer diameter, the outer diameter of the central shaft being approximately equal to or less than both the first inner diameter of the first central portion and the second inner diameter of the second central portion such that the interior and exterior sections are sized to be mounted onto the central shaft, wherein the interior and exterior sections are configured to non-overlappingly interconnect with each other such that the first helical portion of the interior section and the second helical portion of the exterior section are non-overlapping and the interconnected interior and exterior sections form at least a portion of the helical multi-piece auger that is rotatable by a moving fluid to facilitate generation of energy from the rotation of the helical multi-piece auger.

2. The helical multi-piece auger rotatable by the moving fluid for the generation of energy of claim 1, the helical multi-piece auger being interconnected with a generator such that the rotation of the helical multi-piece auger by the moving fluid generates energy.

3. The helical multi-piece auger rotatable by the moving fluid for the generation of energy of claim 2, wherein the second cylindrical opening of the second central portion of the exterior section is sized substantially similar to the first cylindrical opening of the first central portion.

4. The helical multi-piece auger rotatable by the moving fluid for the generation of energy of claim 2, the helical multi-piece auger comprising several interior sections that are rotational molded with identical central portions, the first radial arc of each of the several interior sections extending approximately 90 degrees circumferentially around the central shaft.

5. The helical multi-piece auger rotatable by the moving fluid for the generation of energy of claim 4, wherein the several interior sections are non-overlappingly interconnected such that adjoining surfaces are substantially flush with one another alleviating turbulence associated with the moving fluid flowing over surfaces of the helical multi-piece auger.

6. The helical multi-piece auger rotatable by the moving fluid for the generation of energy of claim 1, wherein the interior section has an outer spiral flange approximately perpendicular from to the first helical portion in both directions and the exterior section has a tapered outer spiral flange extending approximately perpendicular from the second helical portion in both directions to allow the helical multi-piece auger to capture a tidal flow coming from various directions and then re-orientate the helical multi-piece auger in a direction of the tidal flow.

7. The helical multi-piece auger rotatable by the moving fluid for the generation of energy of claim 6, wherein edges of the outer spiral flange of the interior section and the tapered outer spiral flange of the exterior section are substantially flush with one another after the interior section is non-overlappingly interconnected with the exterior section.

8. The helical multi-piece auger rotatable by the moving fluid for the generation of energy of claim 1, wherein the helical multi-piece auger comprises two wing-shaped nose cones, one of the wing-shaped nose cones attached at each end of the central shaft, respectively.

9. A helical multi-piece auger rotatable by a moving fluid for the generation of energy comprising:
    an interior section having a first helical portion, a first central portion, and an outer spiral flange, the first helical portion configured to have a first radial arc extending between approximately 45 degrees and approximately 120 degrees circumferentially around the central shaft, the first central portion having a first cylindrical opening of a first inner diameter, and the outer spiral flange extending approximately perpendicular from the first helical portion in both directions;
    an exterior section having a second helical portion, a second central portion, and a tapered outer spiral flange, the second helical portion (1) having a second radial arc extending between approximately 30 degrees and approximately 90 degrees circumferentially around the central shaft and (2) tapering inward radially toward the central shaft with between approximately 5 degrees and approximately 60 degrees of angled movement with respect to the longitudinal axis of the central shaft, the second central portion having a second cylindrical opening of a second inner diameter, and the tapered outer spiral flange extending approximately perpendicular from the second helical portion in both directions; and
    the central shaft is configured to have a cylindrical exterior having an outer diameter, the outer diameter of the central shaft being approximately equal to or less than both the first inner diameter of the first central portion and the second inner diameter of the second central portion such that the interior and exterior sections are sized to be mounted onto the central shaft, wherein the interior and exterior sections are configured to non-overlapping interconnect with each other such that the first helical portion and the outer spiral flange of the interior section and the second helical portion and the tapered outer spiral flange of the exterior section are non-overlapping and substantially flush with one another, respectively, and the interconnected interior and exterior sections form at least a portion of the helical multi-piece auger that is rotatable by a moving fluid to facilitate generation of energy from the rotation of the helical multi-piece auger.

10. The helical multi-piece auger rotatable by the moving fluid for the generation of energy of claim 9, the helical multi-piece auger comprising several interior sections that are rotational molded with identical central portions, the first radial arc of each of the several interior sections extending approximately 90 degrees circumferentially around the central shaft.

11. The helical multi-piece auger rotatable by the moving fluid for the generation of energy of claim 10, wherein the several interior sections are non-overlappingly interconnected such that adjoining surfaces of adjacent interior sections after interconnection are substantially flush with one another to reduce turbulence associated with the moving fluid flowing over surfaces of the helical multi-piece auger.

12. The helical multi-piece auger rotatable by the moving fluid for the generation of energy of claim 9, wherein helical multi-piece auger is configured to allow the outer spiral flange of the interior section and the tapered outer spiral flange of the exterior section to capture a tidal flow coming from various directions and re-orientate the helical multi-piece auger in a direction of the tidal flow.

13. The helical multi-piece auger rotatable by the moving fluid for the generation of energy of claim 9, wherein the helical multi-piece auger comprises two wing-shaped nose cones, one of the wing-shaped nose cones attached at each end of the central shaft, respectively.

14. A method of assembling a helical multi-piece auger, the method comprising:
    mounting two or more interior sections each having a first helical portion, an outer spiral flange, and a first central portion onto a central shaft having a cylindrical exterior having an outer diameter, the first helical portion of each of the two or more interior sections configured to have a first radial arc extending between approximately 45 degrees and approximately 180 degrees circumferentially around the central shaft, the outer spiral flange of each of the two or more interior sections configured to extend perpendicularly from the first helical portion in both directions, and the first central portion of each of the two or more interior sections configured to have a first cylindrical opening of a first inner diameter, the first inner diameter of the two or more interior sections being approximately equal to or greater than the outer diameter of the central shaft such that the two or more interior sections are sized to be mounted onto the central shaft;
    mounting an exterior section having a second helical portion onto the central shaft adjacent to one of the two or more interior sections, the second helical portion having (1) a second radial arc extending between approximately 30 degrees and approximately 90 degrees circumferentially around the central shaft, and (2) tapering inward radially toward the central shaft with between approximately 5 degrees and approximately 60 degrees of angled movement with respect to the longitudinal axis of the central shaft; and
    interconnecting the central shaft and/or the helical multi-piece auger after assembly with a generator configured to generate energy from the rotation of the helical multi-piece auger caused by a moving fluid acting on the two or more interior sections mounted on the central shaft,
    wherein the two or more interior sections are configured to non-overlappingly interconnect with each other such that adjoining surfaces of adjacent ones of the two or more interior sections are substantially flush with one another to reduce turbulent flow of the moving fluid flowing over the first helical portion and the outer spiral flange of the two or more interior sections, and the interconnected two or more interior sections form at least a portion of the helical multi-piece auger that is rotatable by the moving fluid to facilitate generation of energy via the interconnected generator.

15. The method of assembling a multi-piece helical auger of claim 14, wherein
    the exterior section has a second central portion having a second cylindrical opening of a second inner diameter, the second inner diameter being approximately equal to or greater than the outer diameter of the central shaft such that the exterior section is sized to be mounted onto the central shaft.

16. The method of assembling a multi-piece helical auger of claim 15, wherein the exterior section has a tapered outer spiral flange approximately perpendicular to the second helical portion in both directions, the interior and exterior sections being configured such that an edge of the outer spiral flange and an adjoining edge of the tapered outer spiral flange are substantially even with one another after the interior and exterior sections are non-overlappingly interconnected to reduce turbulent flow of the moving fluid.

17. The method of assembling a multi-piece helical auger of claim 14, wherein the two or more interior sections are rotational molded and have a radial coverage of approximately 90 degrees around a circumference of the central shaft.

18. The method of assembling a multi-piece helical auger of claim 14, the method further comprising mounting a wing-shaped nose cone on at least one end of the central shaft.

* * * * *